(12) United States Patent
Levi et al.

(10) Patent No.: US 12,049,367 B2
(45) Date of Patent: Jul. 30, 2024

(54) SYSTEM AND METHOD FOR TRANSFERRING AND PROCESSING OBJECTS

(71) Applicant: Velox-PureDigital Ltd., Rosh Ha'ayin (IL)

(72) Inventors: Yaakov Levi, Kfar Yona (IL); Itay Raz, Mazkeret Batia (IL)

(73) Assignee: VELOX-PUREDIGITAL LTD., Rosh Ha'ayin (IL)

( * ) Notice: Subject to any disclaimer, the term of this patent is extended or adjusted under 35 U.S.C. 154(b) by 195 days.

(21) Appl. No.: 17/634,757

(22) PCT Filed: Aug. 5, 2020

(86) PCT No.: PCT/IL2020/050856
§ 371 (c)(1),
(2) Date: Feb. 11, 2022

(87) PCT Pub. No.: WO2021/028904
PCT Pub. Date: Feb. 18, 2021

(65) Prior Publication Data
US 2022/0274784 A1 Sep. 1, 2022

(30) Foreign Application Priority Data

Aug. 14, 2019 (IL) .......................................... 268713

(51) Int. Cl.
| B65G 47/32 | (2006.01) |
| B65G 43/08 | (2006.01) |
| B65G 47/52 | (2006.01) |
| B65G 47/90 | (2006.01) |

(52) U.S. Cl.
CPC ............. *B65G 47/32* (2013.01); *B65G 43/08* (2013.01); *B65G 47/52* (2013.01); *B65G 47/905* (2013.01)

(58) Field of Classification Search
None
See application file for complete search history.

(56) References Cited

U.S. PATENT DOCUMENTS

| 1,935,409 A | 11/1933 | Mudd |
| 4,142,626 A | 3/1979 | Bradley |
| 4,325,475 A | 4/1982 | Spalding |
| 5,018,334 A | 5/1991 | Guttinger et al. |
| 5,261,522 A | 11/1993 | Guttinger et al. |
| 5,611,418 A | 3/1997 | Helmstetter |

(Continued)

FOREIGN PATENT DOCUMENTS

| CN | 1137465 A | 12/1996 |
| CN | 1778638 A | 5/2006 |

(Continued)

OTHER PUBLICATIONS

International Search Report for PCT Patent App. No. PCT/IL2020/050856 (Oct. 29, 2020).

*Primary Examiner* — Kavel Singh
(74) *Attorney, Agent, or Firm* — Kenealy Vaidya LLP

(57) ABSTRACT

System and method for interfacing between conveyors utilizing at least one detachment system to detach a batch of objects from a respective at least one serial feed conveyor, and at least one loading tray to receive a batch of the objects from a respective at least one detachment system, move towards a movable support assembly and discharge the batch of objects thereby carried onto a respective array of grippers of said movable support assembly.

50 Claims, 8 Drawing Sheets

(56) References Cited

U.S. PATENT DOCUMENTS

| | | | |
|---|---|---|---|
| 5,897,291 A | 4/1999 | Gerwe et al. | |
| 8,583,279 B2 | 11/2013 | Fecht | |
| 9,663,305 B2 * | 5/2017 | Papsdorf | B65G 54/02 |
| 10,919,705 B2 * | 2/2021 | Papsdorf | B65G 35/06 |
| 11,299,353 B2 * | 4/2022 | Cofler | B65G 47/082 |
| 2006/0108198 A1 | 5/2006 | Guidetti | |
| 2010/0199599 A1 * | 8/2010 | Bonnain | B65B 5/026 53/147 |
| 2011/0036684 A1 | 2/2011 | Bonnain | |
| 2012/0325622 A1 | 12/2012 | Gatos | |
| 2013/0286123 A1 | 10/2013 | Olejniczak et al. | |
| 2015/0321857 A1 | 11/2015 | Sacchetti et al. | |
| 2019/0127156 A1 | 5/2019 | Eusebione et al. | |
| 2021/0047131 A1 | 2/2021 | Cofler et al. | |

FOREIGN PATENT DOCUMENTS

| | | | | |
|---|---|---|---|---|
| CN | 101163574 A | | 4/2008 | |
| CN | 102015496 A | | 4/2011 | |
| CN | 104661824 A | | 5/2015 | |
| CN | 104781148 A | | 7/2015 | |
| CN | 207632105 U | | 7/2018 | |
| CN | 109757102 A | | 5/2019 | |
| DE | 102012105005 A1 | | 12/2013 | |
| EP | 0551613 A1 | | 7/1993 | |
| EP | 2254816 | | 12/2010 | |
| GB | 1524164 A | | 9/1978 | |
| GB | 2003824 A | * | 3/1979 | ............ B65B 35/38 |
| GB | 2003824 A | | 3/1979 | |
| IL | 257582 B | | 8/2021 | |
| JP | 2017114657 A | | 6/2017 | |
| WO | 2006098556 A1 | | 9/2006 | |
| WO | 2009083791 A1 | | 7/2009 | |
| WO | 2014/076704 A1 | | 5/2014 | |
| WO | 2015/177598 A1 | | 11/2015 | |
| WO | 2015/177599 A1 | | 11/2015 | |
| WO | 2018/092143 A1 | | 5/2018 | |
| WO | 2019/159179 A1 | | 8/2019 | |

* cited by examiner

SYSTEM AND METHOD FOR TRANSFERRING AND PROCESSING OBJECTS

CROSS REFERENCE TO RELATED APPLICATION(S)

This application is a national phase filing under 35 C.F.R. § 371 of and claims priority to PCT Patent Application No. PCT/IL2020/050856, filed on Aug. 5, 2020, which claims the priority benefit under 35 U.S.C. § 119 of Israeli Application No. 268713 filed on Aug. 14, 2019, the contents of each of which are hereby incorporated by reference in their entireties.

BACKGROUND

Some embodiments of the presently disclosed subject matter is generally in the field of conveyors, and in particular relates to transferring objects between conveyors.

Conveyors are essential components of almost every production line and/or object processing/treatment line. Many systems utilizes two or more different independent conveyors, each of which is specially designed to serve a stream of objects for a specific production and/or object treatment/processing task (e.g., object formation, pre-paint/cleaning treatment, paint/print, labeling, packaging, and the like). There are many solutions known in the art for interfacing between different conveyors, for example, as described in U.S. Pat. Nos. 1,935,409, 4,325,475, 4,142,626, 5,018,334, EP 0551613, U.S. Pat. Nos. 5,611,418, 5,261,522.

The control tasks and design complexity of the equipment used for interfacing between conveyors become substantially more demanding when the objects should be transferred between serial and parallel conveying machineries, and/or between machineries demanding different object paces/gaps. For example, when transferring objects from a serial conveyor to a parallel conveyor, the interfacing equipment can be required to accumulate a batch of a predefined number of objects, adjust the pace/gaps between the accumulated batch of objects, and simultaneously transfer the accumulated and pace/gaps-adjusted batch of objects to the parallel conveyor, ideally without interrupting the continuous operations of the conveyors.

Some conveyors interfacing solutions know from the patent literature are briefly described hereinbelow.

U.S. Pat. No. 5,897,291 describes a method of forming arrays of articles, comprising: (a) providing a stacker having a plurality of compartments for receiving the articles, the stacker traveling along a closed loop path; (b) transporting a plurality of the articles along a first path to the stacker in sequential fashion; (c) introducing the articles into the compartments at an inlet position; (d) removing a first array of the articles from the stacker at a first stripping position by urging the articles from the compartment in a first stripping direction; (e) transporting the first array along a second path away from the stacker in a direction substantially opposite to the first stripping direction; and (f) repeating steps (b) through (e) for subsequent articles.

U.S. Pat. No. 8,583,279 describes a method and device for handling flat objects, particularly flat folded diapers, which are fed to a conveyor with receptacles for each object by a feeder, in particular to a compartment conveyor including separation struts which are arranged so as to protrude radially from a continuous conveyor in order to form compartments for each object. Provision is made for the speed at which the objects are transported on the feeder to be reduced for handover of the objects to the conveyor. The device includes a database in which respective data records containing transport speeds for a control unit being filed for different objects and/or objects of different size, the speed of the feeders being regulated by the control unit in accordance with the transport speed pertaining to the respective object.

US Patent Publication No. 2012/325622 relates to a machine for products having a non-circular cross-section, such as ovoid containers or bottles. The machine includes: a collector having cavities arranged obliquely relative to longitudinal axis of the conveyor used to supply the products; a means for transferring the batch of products formed into groups by the collector to a depositing station, on a table arranged along the feed conveyor; a means for dropping the batch of products by a reversing movement in an oblique direction; and a means for returning the collector to the starting point, that is, level with the first product on the feed conveyor.

GENERAL DESCRIPTION

Industrial production lines usually utilize types of serial transport conveyors (e.g., belt or chain conveyors or types of drums/turret-head machinery) in various stages of the production process and/or for applying treatments to the produced objects. Such serial transport conveyors are not so efficient and can provide very limited throughputs, which is particularly disadvantageous for application of various treatments processes, such as, but not limited to, surface cleaning and/or treatment, painting and/or printing, curing, and suchlike. Substantially improved efficiency and production rates can be achieved using machinery configured to simultaneously transport and treat one or more arrays of objects i.e., configured to simultaneously treat one or more arrays of the transported objects.

Since most conventional production lines utilize types of serial conveying machinery, there is a need for suitable equipment for interfacing between such serial conveying systems and parallel treatment machinery that can transport one or more arrays of objects and apply treatments thereto. For example, international patent application No. PCT/IL2019/050191 of the same applicant hereof, the content of which is incorporated herein by reference, describes possible solutions for interfacing between serial and parallel conveyor systems.

The present disclosure is directed to machinery for interfacing between two or more objects conveyor systems, at least one of which is configured to simultaneously transport and treat one or more arrays of objects. A conveyors interfacing system is disclosed that is configured to receive one or more continuous streams of objects supplied by serial feed conveyors, remove one or more batches/arrays of the supplied objects and transfer them to a support assembly. The support assembly is configured to pass the received one or more batches/arrays of objects through one or more treatment processes, such as, but not limited to, an object cleaning/washing process (e.g., for dust and/or fats removal), a surface treatment process (e.g., corona and/or plasma), a printing process, a curing process (e.g., ultraviolet—UV), and suchlike.

The conveyors interfacing system includes a loading system configured to remove the one or more batches/arrays of the objects from respective one or more serial feed conveyors, transfer the removed one or more batches/arrays of objects to the support assembly, and place each batch/array of objects on a respective array of grippers of the support assembly. The loading system includes one or more loading trays, each loading tray configured to receive a respective batch/array of the objects removed from a respective one of the serial feed conveyors, move to a location adjacent to the support assembly, and propel each of the objects thereby carried onto a respective gripper of the support assembly.

In some embodiments at least one of the serial feed conveyors is configured to hold the objects thereby carried by spaced-apart attractor assemblies provided in a carrier medium thereof (e.g., belt, chain, or suchlike). The loading system can utilize a respective at least one detachment system configured to remove a batch/array of objects from the serial feed conveyor and place the removed objects on a respective loading tray. The detachment system can have a moving arm configured to move towards one side of the batch/array of objects and strike and detach them from their respective attractor units onto the respective loading tray located at another/opposite side of the objects.

The moving arm includes in some embodiments an array of attractor units, each attractor unit configured to attract and hold a respective one of the objects as the moving arm strikes and detach the objects from the serial feed conveyor. After detaching the batch/array of objects from the serial feed conveyor the moving arm is moved with the detached objects towards the loading tray, and deactivate its attractor units in the vicinity of the loading tray to release the objects thereby carried onto the loading tray. The moving arm can be then moved back into an idyllic state, typically above the serial feed conveyor and the objects thereby carried, to detach a new batch/array of objects from the serial feed conveyor.

At least one sensing unit e.g., imager, can be used in the detachment system to detect the objects entering the loading system over the serial feed conveyor and generate data/signals indicative thereof. A control unit can be used to process the data/signals generated by the sensing unit and detect therein the absence of one or more objects in each batch of objects entered by the serial feed conveyor into the loading system. In some embodiments the control unit is configured to control the operation of the attractor units of the moving arm so as to immobilize movement of a group of the objects introduced into the loading system during movement of the serial feed conveyor and thereby fill empty object locations formed along its length due to the absence of one or more of the objects.

After all or most empty object locations along the moving arm are filled, all or most attractors thereof are brought into their active states for attaching respective ones of the introduced objects thereto, and the moving arm is moved towards the respective loading tray to detach the objects from the serial feed conveyor and place them on the loading tray. In some possible embodiments the moving arm is configured to activate at least one of its attractor units in its idyllic state, to attach objects thereto, as the objects are introduced into the loading zone by the serial feed conveyor, if so needed selectively activate one or more additional attractor units until all or most object locations along its length are occupied by respective objects, carry out a downward movement to detach the objects from the serial feed conveyor and place them on the respective moving tray, and thereafter move upwardly back into its idyllic state above the serial feed conveyor before new objects are moved into the loading system by the serial feed conveyor.

In some embodiments each loading tray includes a set of cradle arrangements, each cradle arrangement configured to receive and hold one object of a batch/array of objects transferred thereto from the detachment system. Each moving tray can include an array of actuators, each actuator configured to propel/discharge one of the objects carried by the loading tray onto a respective gripper of the support assembly. In some embodiments each actuator includes an attractor unit configured to attract and hold the object thereby propelled/discharged. One or more sensors can be used in each actuator for detecting malfunctions of the attractors and/or actuators, and/or for detecting failures to transfer one or more of the objects carried by the loading tray to a respective gripper of the support assembly, and generating sensor data indicative thereof. Based on the sensor data/signals, the loading unit can control one or more of the actuators, and their respective attractors, to retract objects that failed to transfer to the support assembly back to their respective cradle arrangement on the loading tray.

Alternatively, in some embodiments a single actuator is used in each loading tray to push the batch/array of objects thereby held by an actuator arm onto a respective array of grippers of the support assembly. The actuator arm can have a respective array of attractor units along its length, each attractor unit configured to attract and attach thereto a respective one of the batch/array of objects. Optionally, but in some embodiments, each of the attractor units is installed in a moving plunger mechanism provided in the actuator arm and configured to soften the actuation mechanism used for pushing the objects from the loading tray onto the grippers. Particularly, each attractor can be installed at one end of a plunger element movably and sealably disposed in an opening of a respective barrel element. An elastic element, such as a spring, provided in the barrel element is used to continuously push the plunger element outwardly towards the objects placed on the loading tray.

A sensing device provided inside each barrel element can be used to detect failure of one or more of the plunger mechanisms to place their respective objects on respective grippers whenever the plunger elements are pressed into their respective barrel element a certain length. For example, and without being limiting, a pressure sensor can be mounted in the barrel, and the system can be configured to identify failures in placing objects on respective grippers whenever data/signals from the pressure sensor is indicative of increased pressure conditions inside the barrel i.e., when the pressure measured inside the barrel is greater than normal pressure conditions inside the barrel.

Optionally, but in some embodiments, each loading tray includes a conveyor unit configured to laterally convey the cradle arrangements of the tray. The loading system can use the conveyor units of the loading trays to adjust the location of the cradles of the loading tray for aligning them with the grippers of the support assembly, and/or for laterally discharging objects from the loading tray. For example, the conveyor units of the loading trays can be used to laterally remove the objects that failed to transfer to the support assembly, by operating the conveyor units of loading trays carrying such objects after propelling of the objects by the actuator(s)/actuator arm was performed.

In possible applications an unloading system is used to unload one or more batches/arrays of objects from the support assembly e.g., after one or more treatment processes are applied to the objects thereby carried. The unloading system can user unloading trays, that are substantially similar to the loading trays of the loading system, to remove the one or more batches/arrays of the objects and place then onto respective one or more dispatch conveyors, or to move them directly to packaging means e.g., laterally remove the objects into containers.

For example, the unloading tray can be moved towards the support assembly and placed to face a batch/array of objects thereby carried, the actuator(s)/actuator arm can be then moved towards the objects and its attractor units can be activated to attract and attached each object to a respective attractor unit. Thereafter, the actuator(s)/actuator arm can be retracted to remove the objects from their respective grippers and place each removed object on a respective cradle arrangement of the unloading tray. In some embodiments, after the objects are removed from the grippers of the support assembly, the unloading tray is moved into a discharge position, in which its conveyor unit is activated to laterally discharge the objects onto a conveyor system or packaging means, or into containers.

One disclosed inventive aspect relates to a system for interfacing between conveyors. The system includes at least one detachment system (also referred to herein as object translation system) configured to detach a batch of objects from a respective at least one serial feed conveyor, and at least one loading tray configured to receive a batch of the objects from a respective at least one detachment system, move towards a movable support assembly and discharge the batch of objects thereby carried onto a respective array of grippers of the support assembly.

The detachment system includes in some embodiments at least one moving arm configured to strike the batch of objects from one side thereof, detach the objects from the respective serial feed conveyor and place them on a respective loading tray positioned at another side of the objects. Optionally, but in some embodiments, the at least one moving arm includes a respective attractor unit for each object thereby detached from the serial feed conveyor. The detachment system can be thus configured to activate the attractor units when the at least one moving arm is moved towards the objects of the batch to attach them thereto.

At least one sensor device can be used in the detachment system to generate signal and/or data indicative of presence or absence of one or more objects in the batch of objects introduce by the serial feed conveyor. The detachment system can be configured to identify absence of one or more objects in the received batch of objects and responsively selectively activate one or more of the attractor units until all or most empty object locations in the received batch of objects are occupied by objects introduced over the serial feed conveyor.

A plurality of cradle arrangements can be used in each loading tray. The cradle arrangement is configured to receive thereon an object from a batch of the objects placed thereon by the detachment system. Optionally, but in some embodiments, each loading tray includes a conveyor unit. The conveyor unit of the loading tray is configured to laterally move the objects thereby carried.

The loading tray includes in some embodiments a respective attractor unit for each object of the batch. The attractor unit is configured to apply attraction forces over the respective object. At least one actuator can be used in the loading tray to push the objects from the loading tray onto respective grippers of the support assembly. A sensor unit associated with each attractor unit can be used to at least detect object presence near the attractor unit and generate data/signals indicative thereof. The sensor unit can be configured to detect failure to transfer one or more of the objects from the loading tray to the support assembly, and generate sensor data/signals indicative thereof.

Optionally, but in some embodiments, the loading tray includes a respective plunger and barrel mechanism for each of the objects thereby carried. The plunger of each plunger and barrel mechanism is configured to be elastically pushed outwardly from its respective barrel, and its free end includes the attractor unit for attaching the respective object thereto. At least one control unit can be used to process the sensor data/signals and determine based thereon absence of one or more objects in the batch of the objects transferred to the loading tray. Optionally, a pressure sensor is used in each sensor unit. The at least one control unit can be configured to detect failure to transfer the respective object responsive to pressure changes inside the respective barrel element.

In some possible embodiments the movable support assembly is configured to pass the one or more objects thereby carried through one or more treatment process zones. The at least one control unit can be thus configured and operable to indicate to the at least one process zones the absence of one or more of the objects. The system can be configured to activate respective one or more attractor units to move the one or more objects that did not transfer from the loading tray to the support assembly back to the loading tray.

The conveyor unit of the loading tray can be configured to dispose one or more objects that did not transfer to the support assembly therefrom. Optionally, but in some embodiments, the system includes two loading trays.

The system includes in some possible embodiments at least one unloading tray configured to pull a batch of the objects thereonto from a respective array of grippers of a support assembly. The unloading tray can have a plurality of cradle arrangements. Each cradle arrangement is configured to receive thereon an object from a batch of the objects pulled from the array of grippers. The unloading tray includes in some embodiments a conveyor unit. The conveyor unit can be configured to laterally move the objects carried by the unloading tray. The conveyor unit can be used to adjust the location of the cradles of the the unloading tray for aligning them with the grippers of the support assembly, and/or for laterally discharging objects from the unloading tray.

The unloading tray can have a respective attractor unit for each one of the objects. The attractor unit can be configured to apply attraction forces over the respective object. At least one actuator can be used in the unloading tray to pull the objects from the grippers of the support assembly by the respective attractor units.

Optionally, but in some embodiments, the unloading tray includes a respective plunger and barrel mechanism for each of the objects. The plunger of the plunger and barrel mechanism can be configured to be elastically pushed outwardly from the respective barrel element, and it includes the attractor unit at its free end. A sensor unit associated with attractor unit can be used to at least detect object presence near the attractor unit and generate data/signals indicative thereof. The sensor unit can be configured to detect failure to transfer one or more of the objects from the support assembly to the unloading tray and generate sensor data/signals indicative thereof. The system can include at least one control unit configured and operable to process the sensor data/signals and determine based thereon absence of one or more of the objects transferred to the unloading tray from the support assembly.

The unloading tray can be configured to use a conveyor unit thereof to dispose therefrom the objects transferred thereto from the support assembly. Optionally, but in some embodiments, the system includes two unloading trays.

Another disclosed inventive aspect relates to a method of interfacing between conveyors. The method includes receiving at least one batch of objects from a respective at least one serial feed conveyor system, detaching the at least one batch of objects from the at least one serial feed conveyor system onto a respective at least one loading tray, moving the at least one loading tray towards a movable support assembly, and discharging the at least one of batch of objects carried by the at least one loading tray onto a respective array of grippers of the support assembly.

The detaching of the at least one batch of objects includes in some embodiments moving at least one moving arm to strike the objects from one side thereof and to place the objects on a respective loading tray positioned at another side of the objects. The detaching of the at least one batch of objects can include applying attraction forces over each one of the objects to attach the objects to the at least one moving arm.

The method can include detecting by a respective sensor device presence or absence of one or more of the objects of the batch of objects introduced by the serial feed conveyor, and generating signal and/or data indicative thereof. The detaching of the at least one batch of objects can include identifying absence of one or more of the objects in the received batch of objects and responsively selectively activating one or more of the attractor units until all or most empty objects locations in the received batch of objects are occupied by the objects introduced over the serial feed conveyor.

The discharging of the at least one batch of objects from the loading tray includes in some embodiments applying attraction forces over each one of the objects. The discharging of the at least one batch of objects from the loading tray can include pushing the objects from the loading tray onto respective grippers of the support assembly by at least one pushing arm.

The method including in some embodiments detecting by a respective sensor device presence or absence of a respective object of the batch of objects. Optionally, but in some embodiments, the pushing of each one of the objects utilizes a respective plunger and barrel mechanism. The method can include identifying failure to transfer one or more of the objects from the loading tray based on pressure changes measured in the respective plunger and barrel mechanisms. Optionally, the method including indicating to at least one process zone used for treating the objects the absence of one or more of the objects.

The method includes in some embodiments moving the one or more of the objects that failed to transfer from the loading tray to the support assembly back to the loading tray. The method can also include discharging from the loading tray the one or more objects that did not transfer to the support assembly.

The method includes in some embodiments unloading a batch of the objects onto a respective unloading tray from a respective array of grippers of the support assembly. The unlading of the objects can include applying attraction forces on each one of the objects. The method can include detecting by a respective sensor unit presence of a respective object of the batch. The sensor unit can be used to detect failure to transfer one or more of the objects from the support assembly to the unloading tray. The method may include discharging from the unloading tray the objects transferred thereto from the support assembly.

Yet another disclosed inventive aspect relates to a detachment system for detaching a batch of objects from a serial feed conveyor. The detachment system includes in some embodiments at least one moving arm configured to strike the batch of objects from one side thereof, detach the objects from the respective serial feed conveyor and place them on a loading tray positioned at another side of the objects. In some embodiments the at least one moving arm is configured to move downwardly to detach the batch of objects from the serial feed conveyor, for placing the detached objects on a loading tray located below the objects. The detachment system can include in the at least one moving arm a respective attractor unit for each object of the batch of objects. The attractor unit configured to apply attraction forces over the object while detaching it from the serial feed conveyor. The detachment system can also include at least one sensor unit configured to detect presence or absence of the objects in the batch of objects and generate signals and/or data indicative thereof.

The detachment system configured to process the data and/or signals generated by the at least one sensor unit to identify absence of one or more objects in the received batch of objects, and selectively activate one or more of the attractor units to immobilize respective one or more of the objects until all or most object locations in the batch of objects are occupied by respective objects.

A yet another disclosed aspect relates to an object translation system configured to move a batch of objects to, or from, a tray of objects. The object translation system includes in some embodiments a plunger and barrel mechanism for each object carried by the tray. The plunger of each plunger and barrel mechanism is configured to be elastically pushed outwardly from a respective barrel element thereof. The plunger has an attractor unit at its free end for applying attractions forces over the respective object.

BRIEF DESCRIPTION OF THE DRAWINGS

In order to understand some embodiments of the presently disclosed subject matter and to see how it may be carried out in practice, embodiments will now be described, by way of non-limiting example only, with reference to the accompanying drawings. Features shown in the drawings are meant to be illustrative of only some embodiments of the presently disclosed subject matter, unless otherwise implicitly indicated. In the drawings like reference numerals are used to indicate corresponding parts, and in which:

FIGS. 2A to 2F schematically illustrate an object loader system according to some possible embodiments, wherein FIGS. 2A and 2B are top and front views showing removal of a one or more batches of objects from respective one or more serial feed lines onto respective one or more loading trays, FIG. 2C shows the one or more loading trays moved for engaging an empty object transporter, FIG. 2D shows the one or more batches of objects propelled onto grippers of the object transporter, FIG. 2E shows discharging of unpropelled objects from the loading trays, and FIG. 2F is a flowchart of an object loading process according to some possible embodiments;

FIGS. 3A and 3B schematically illustrate components and operation of a detachment system according to some possible embodiments, wherein FIG. 3A shows a front view of the detachment system, and FIG. 3B is a flowchart illustrating a possible object detachment process;

FIGS. 4A and 4B schematically illustrate an object loader system according to an alternative embodiment, wherein FIG. 4A is a top view showing the object loader system before the objects thereby carried are pushed/propelled onto respective grippers of the support assembly, and FIG. 4B is a top view showing the object loader system after the objects are pushed/propelled onto their respective grippers; and FIGS. 5A to 5D schematically illustrate an object unload system according to some embodiments, wherein FIG. 5A shows one or more unloading trays moved for engaging an empty object transporter, FIG. 5B shows the one or more unloading trays after their attractor(s) are propelled towards the grippers of the transporter, FIG. 5C shows the one or more unloading trays after their attractor(s) are retracted to remove respective one or more batches of objects from the transporter and their conveyors are activated to discharge the removed one or more batches of objects, and FIG. 5D is a flowchart illustrating object unloading according to some possible embodiments.

DETAILED DESCRIPTION OF EMBODIMENTS

Figure 1:
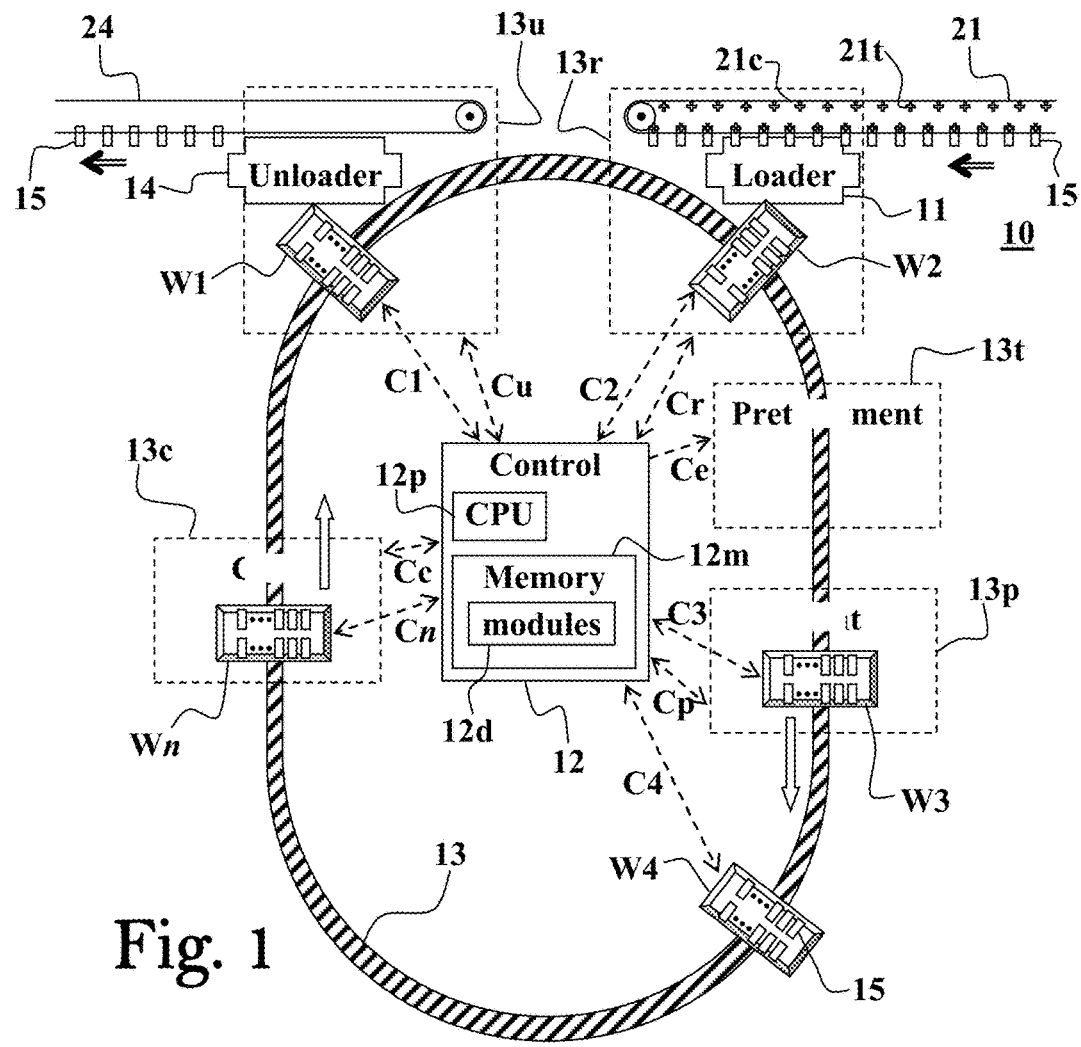
FIG. 1 schematically illustrates an object treatment system according to some possible embodiments having a serial object feed line and a serial object dispatch line.

One or more specific embodiments of the present application will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical for understanding some embodiments of the presently disclosed subject matter. Emphasis instead being placed upon clearly illustrating the principles of some embodiments of the presently disclosed subject matter such that persons of ordinary skill in the art will be able to make and use it, once they understand the principles of the disclosed subject matter. Some embodiments of the presently disclosed subject matter may be provided in other specific forms and embodiments without departing from the essential characteristics described herein.

Some embodiments of the presently disclosed subject matter provides techniques for transferring objects supplied by a serial feed conveyor system, utilizing continuous array of attractors to hold the objects and move them, into a loading zone of an object treatment system configured to treat one or more batches/arrays of the objects transported therein on respective one or more support assemblies/platforms (wagons). A loader system provided in the loading zone removes one or more batches of the objects from the serial feed conveyor, and places the removed objects onto respective one or more arrays of grippers provided in a support assembly of the treatment system. The serial feed conveyor is configured in some embodiments to supply the objects to the treatment system directly from a production line of the objects. The one or more batches of objects loaded onto the support assemblies are transported in the treatment system for passage through one or more treatment zones (e.g., cleaning, surface treatment, printing, curing) for thereby treating at least some portion of each object, and thereafter to an unloading zone of the treatment system for removal therefrom.

An unloading system provided in the unloading zone is used to remove the one or more batches of the objects from the one or more arrays of grippers of the support assembly, and discharge the removed batches of the objects into containers, or to packaging means, or move them to any other conveyor system suitable for transferring the objects from the treatment system. Optionally, but in some embodiments, the unloading system is configured to discharge the one or more batches of the objects onto a dispatch conveyor system. Optionally, the dispatch conveyor is implemented by a serial conveyor system configured to transfer the treated objects to another production line e.g., filling line, but it may as well be implemented by any type of continuous belt or packaging conveyor.

The loading system includes in some embodiment a detachment system configured to detach the one or more batches/arrays of the objects from the serial feed conveyor system onto respective one or more loading trays. The detachment system can use an array of movable and controllable attractor units configured to be selectively, or simultaneously, activated to attach thereto a respective batch/array of objects introduced into the loading system by the serial feed conveyor, and to move the batch/array of objects thereto attached onto the loading trays. In some embodiments the loading trays are configured to sense the presence, or absence, of objects transferred thereto from the serial feed conveyor system and issue corresponding data/signals indicative thereof to report absence of one or more objects in each batch/array of objects, and/or to remove from the loading tray one or more objects that the loading system did not manage to place onto respective grippers of the support assembly.

The unloading system is configured to remove the one or more batches/arrays of the objects from the respective one or more arrays of grippers of a support assembly positioned in the unloading zone, onto respective one or more unloading trays thereof. The unloading trays are configured in some embodiments to sense the presence, or absence, of objects transferred thereto from the support assembly, and issue corresponding data/signals indicative thereof to report absence of one or more objects in each batch/array of objects removed from the support assembly.

For an overview of several example features, process stages, and principles of some embodiments, the exemplary loading/unloading systems illustrated schematically and diagrammatically in the figures are intended for a printing system. These loading/unloading systems are shown as one example implementation that demonstrates a number of features, processes, and principles used to provide a very high throughput system for printing on surface areas of objects (e.g., beverage cans), but they are also useful for other applications and can be made in different variations. Therefore, this description will proceed with reference to the shown examples, but with the understanding that some embodiments of the presently disclosed subject matter recited in the claims below can also be implemented in various other ways, once the principles are understood from the descriptions, explanations, and drawings herein. All such variations, as well as any other modifications apparent to one of ordinary skill in the art and useful in object treatment processes may be suitably employed, and are intended to fall within the scope of this disclosure.

FIG. 1 schematically illustrates an objects treatment system 10 utilizing a loader system (also referred to herein as loading system) 11 configured to move one or more batches of objects 15 supplied by respective one or more serial feed conveyor systems 21, and place the removed one or more batches of objects 15 on a support assembly Wi (where $1 \leq i \leq n$ is an integer) located in a loading zone 13r of the treatment system 10. The treatment system 10 includes an unloading (also referred to herein as unloader) system 14 configured to remove one or more batches of the objects 15 from a support assembly Wj (where $j \neq i$ and $1 \leq i \leq n$ is an integer) located in an unloading zone 13u of the system 10, and a lane (e.g., one or more rails/tracks) 13 having one or more treatment zones 13t, 13p, 13c, . . . , configured to apply respective one or more treatment processes to objects 15 moved by the support assemblies Wi over the lane 13. In some embodiments the unloading system 14 is configured to place the one or more batches of the objects removed from the support assembly Wj on respective one or more dispatch conveyor systems 24.

The treatment system 10 includes a control system 12 having one or more processors 12p and memories 12m configured and operable to receive various data/signal indications from the different systems/units, and generate corresponding control data/signals for operating the different systems/units. For this purpose one or more modules 12d can be loaded (e.g., from a memory device or a remote computer) into the one or more memories 12m, and executed by the one or more processors 12p, of the control system 12. In this specific and non-limiting example the control system 12 is configured and operable to communicate sensory and/or control data/signals Ci with each support assembly Wi on the lane 13. The control system 12 can be configured and operable to communicate sensory and/or control data/signals Cr with the loading system 11, and/or sensory and/or control data/signals Ce with a pretreatment system 13t, and/or sensory and/or control data/signals Cp with a printing system 13p, and/or sensory and/or control data/signals Cc with the curing system 13c, and/or sensory and/or control data/signals Cu with the unloading system 14. The objects treatment system 10 includes in some embodiments one or more additional objects treatment zones (not shown), and it may be as well configured to provide a smaller number of treatment zones than shown in FIG. 1, per application requirements.

Optionally, but in some embodiments, the control system 12 is distributed between the various components of the objects treatment system 10. For example, but without being limiting, each support assembly Wi can includes a respective control unit (now shown) configured and operable to receive and process sensory data/signals of the support assembly Wi, and communicate data/signals with a central control unit at 12. Similarly, at least some of the treatment processes 13t, 13p, 13c, . . . , and/or the unloading system 14, and/or the loading system 11, can include a respective control unit (now shown) configured and operable receive and process sensory data/signals of the respective system, and communicate data/signals with the central control unit at 12.

Though in FIG. 1 one serial feed conveyor system 21 is used to supply the objects 15 to the system 10, more than one serial feed conveyor system can be similarly used, as will be described in details hereinbelow. Each object 15 is carried by a respective attractor assembly 21t of the serial feed conveyor system 21 configured to apply attraction forces over at least some portion of the object 15, and thereby hold and carry it to the treatment system 10. The attractor assemblies 21t are attached in spaced-apart relationship to a continuous carrier (e.g., chain, belt) 21c, and a space/gap between the attractor assemblies 21t substantially equals to a space/gap between grippers (25, shown in FIGS. 2 and 3) provided on the support assemblies Wi, such that there is no need for adjusting of the spacing/gaps between the objects 15 removed from the serial feed conveyor system 21 to the support assemblies Wi. The attractor assemblies 21t can be implemented using any suitable attraction mechanism, such as, but not limited to, suction/vacuum applicators, electromagnetic attractors, electric fields applicators, electrostatic forces applicators, or any combination thereof.

FIG. 1 shows n≥5 (n is an integer) support assemblies on the lane 13, having the support assembly W1 at the unloading zone 13u for unlading one or more batches of objects 15 therefrom, the support assembly W2 at the loading zone 13r for receiving one or more batches of objects 15 thereon, support assembly W3 at the printing zone 13p for printing on one or more batches of objects 15 thereby carried, support assembly W4 moving with one or more batches of printed objects 15 carried thereon from the printing zone 13p towards the curing zone 13c, and support assembly Wn at the curing zone 13c for curing one or more batches of printed objects 15 carried thereon.

The pretreatment system 13t is configured to apply a pretreatment process to surface areas of the objects 15 to facilitate printing thereon, the printing system 13p is configured to print one or more patterns on surface areas of the objects 15, and the curing system 13c is configured to cure the one or more patterns printed on the objects 15. The pretreatment system 13t, the printing system 13p, and the curing system 13c, can be implemented using conventional machinery and techniques, and thus will not be described in details herein. For example, and without being limiting, the various components of the treatment system, such as the lane 13 and the support assemblies Wi, can be implemented using any of the embodiments described and illustrated in international patent publication Nos. WO 2014/076704, WO 2015/177599, WO 2015/177598, and WO 2018/092143, of the same applicant hereof, the disclosure of which is incorporated herein by reference.

Figure 2A:
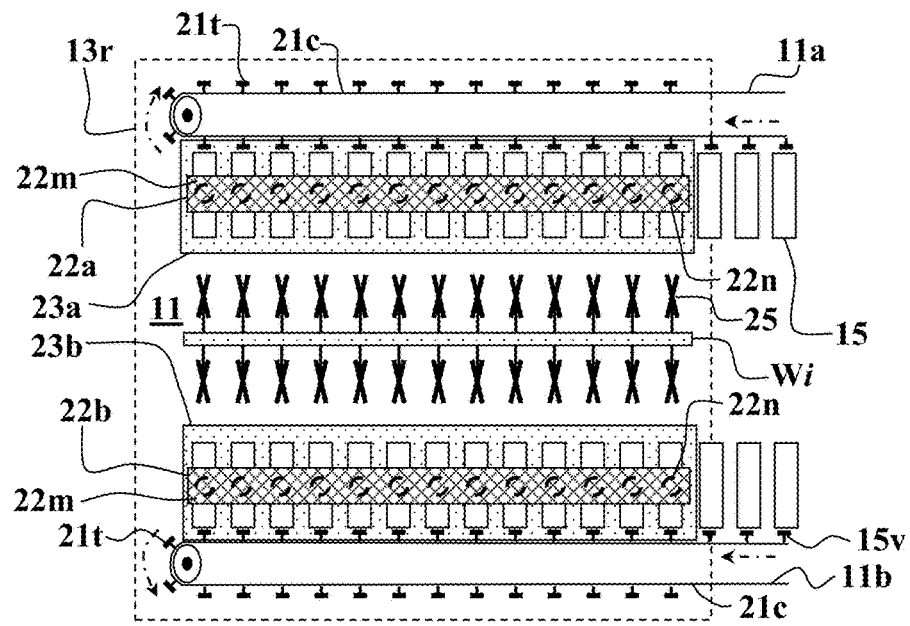

FIG. 2A shows a top view of schematic illustration of the loading system 11 according to some possible embodiments. In this specific and non-limiting loading process example two serial feed conveyor systems, 11a and 11b, are used to supply two respective serial streams of objects 15 to the treatment system 10, wherein each object 15 is held and carried by a respective attractor assembly 21t. A respective detachment system, 22a and 22b (collectively referred to herein as detachment systems 22) is used in the loading system 11 to detach a batch of the objects 15 from each of the serial feed conveyors, 11a and 11b. Each detachment system 22 includes a moving arm 22m configured to move towards and strike a batch of objects introduced into the loading zone 13r by its respective serial feed conveyor system, and thereby separate the struck batch of objects 15 from their respective attractor assemblies 21t.

While, or before, the arms 22m of the detachment systems, 22a and 22b, are moved (e.g., downwardly) towards the batch of the objects 15 from one side of the objects, a respective loading tray, 23a and 23b (collectively referred to herein as loading trays 23), is moved (e.g., upwardly) towards an opposite side of the batch of the objects 15 to reside adjacent thereto. After the loading trays 23 are placed adjacent to the batch of the objects 15, the detachment systems 22 can detach the batch of objects 15 directly onto the loading trays 23. Optionally, but in some embodiments, each moving arm of the detachment systems 22 includes an array of spaced apart attractors 22n (e.g., suction/vacuum applicators, electromagnetic attractors, electric fields applicators, electrostatic forces applicators, or any combination thereof), each configured to apply attraction forces over a respective object 15 of the batch of objects detached from the serial feed conveyor system 11a/11b, to thereby substantially maintain the spacing/gaps between the batch of objects 15 thereby transferred to the moving trays 23. After the batches of objects 15 are transferred onto and held by the loading trays 23, the attractors 22n of the moving arms 22m are deactivated to release their attachment on the batches of objects 15, and the moving arms 22m are then moved (e.g., upwardly) back to their idyllic state to wait for new batches of objects to enter the loading zone 13r.

Figure 2B:
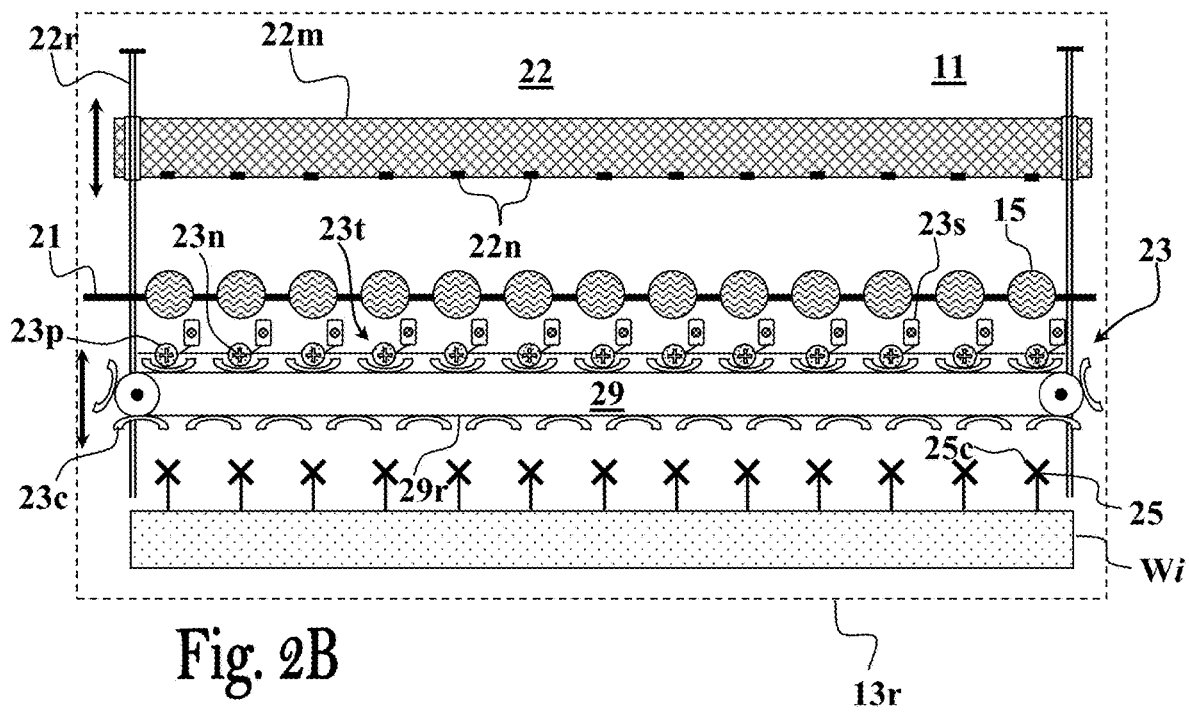

FIG. 2B is a side view showing a detachment system 22 with its moving arm 22m in its idyllic state before detaching a batch of objects 15 supplied by the serial feed conveyor 21 to the loading zone 13r, a loading tray 23 in its idyllic state waiting adjacent to the serial feed conveyor 21 to receive a batch of objects 15 therefrom, and a support assembly Wi positioned in the loading zone 13r for loading objects thereon. Each support assembly Wi includes one or more arrays of grippers 25 configured to receive respective one or more batches of objects 15 from respective one or more serial feed conveyor system 21. In some embodiments each gripper 25 includes one or more attachment elements 25c configured to change into an expanded state when an object 15 is placed over the gripper 25 for holding the object thereon, and into a retracted state to release an object thereby carried after applying one or more treatment processes thereto.

Optionally, the spacing/gaps between the attractors 22n of the moving arms 22m can be adjusted in some embodiments, if there is no compliance between the object spacing/gaps of the serial feed conveyors 21 and of the array of grippers 25. For example, and without being limiting, the attractors 22n of the moving arms 22m can be mounted to a spacer unit, such as described and illustrated in International Patent Application No. PCT/IL2019/050191, for adjusting the spacing/gaps of the objects removed from the serial feed conveyor.

Optionally, but in some embodiments, the loading tray 23 includes a plurality of spaced-apart cradle arrangements 23c, each configured to receive one object 15 detached thereinto by the moving arm 22m from the serial feed conveyor system. Each cradle arrangement 23c of the loading tray 23 is aligned with a respective actuator mechanism 23t of the loading tray 23. The actuator mechanism 23t is configured to push a ram 23p for ejecting an object 15 located in the respective cradle arrangement 23c onto a respective gripper 25 of the support assembly Wi. In some embodiments each actuator mechanism 23t includes a respective attractor 23n (e.g., suction/vacuum applicators, electromagnetic attractors, electric fields applicators, electrostatic forces applicators, or any combination thereof) in its ram 23p configured to apply attraction forces on the object 15 placed in the respective cradle 23c and substantially hold and maintain it therein. One or more sensor units 23s can be also used with each actuator mechanism 23t to determine presence/absence of an object 15 in the cradle arrangement 23c and/or the attraction of an object by the attractor 23n. (e.g., presence or absence of attraction load).

As seen in FIG. 2B, the moving arm 22m can be slidably attached to one or more linear guides 22r, to controllably slide it therewith vertically by suitable actuation mechanism (not shown). As the moving arm 22m slides downwardly towards the loading tray 23, it detaches a batch of objects 15, and transfers each detached object 15 into a respective cradle arrangement 23c of the loading tray 23. The sensor units 23s can be then used to detect the presence of a respective object 15 in each cradle arrangement 23c, and generate data/signals indicative of any cradle arrangements 23c that did not receive a respective object 15. For example, and without being limiting, in some embodiments the attractor mechanism 23n is a type of vacuum attractor including a vacuum/pressure sensor (shown in FIG. 4A) configured to identify the presence of an object 15 at a vacuum aperture, and/or malfunction, of the respective attractor mechanism 23n, and generate corresponding data/signal indicative thereof. The control system 12 can be notified by data/signals Cr from the loading system 11 about absence of an object 15 at, and/or about the malfunction of a respective attractor 23n of, any of the cradle arrangements 23c.

In some embodiments the cradle arrangements 23c are attached to, or are integral parts, of a movable carrier 29r (e.g., chain or belt) of an endless conveyor unit 29 of the loading tray 23. The endless conveyor unit 29 of the loading tray 23 is used to laterally remove objects 15 from the loading tray 23, and/or to adjust the position of the cradle arrangements 23c to align with the respective array of grippers 25, as may be needed. After the batch of objects 15 is detached from the serial feed conveyor system 21 into cradle arrangements 23c of the loading tray 23, the loading tray 23 is moved towards the support assembly Wi for transferring the batch of objects 15 thereby carried onto the grippers 25 of the support assembly Wi. For this purpose the loading tray 23 can be configured to move vertically (upwardly or downwardly) and/or longitudinally (forwardly or backwardly) e.g., using suitable guiding and actuating means (not shown).

Figure 2C:
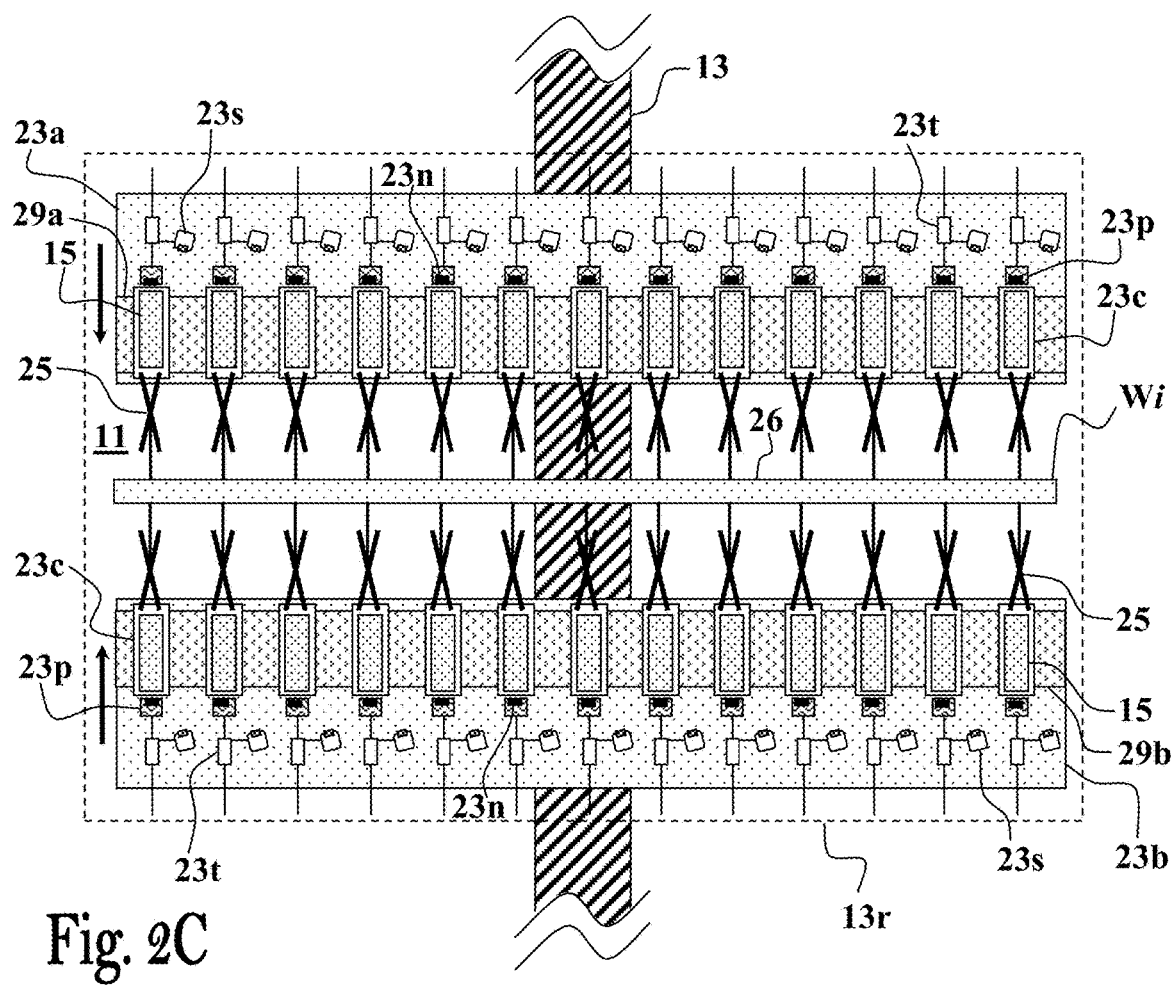

FIG. 2C shows a loading process wherein two loading trays, 23a and 23b, each carrying a batch of objects 15 removed from a respective serial feeder conveyor (11a and 11b in FIG. 2A), are moved towards an engaged position with support assembly Wi positioned in the loading zone 13r. In this state each of the objects 15 carried by the loading trays 23a and 23b is held by a respective attractor 23n in a respective cradle arrangement 23c positioned in front of a respective gripper 25 of the support assembly Wi, and the actuators 23t are in their retracted state ready to push their rams 23p to discharge the objects 15 from the tray 23. If adjusting positions of the objects 15 of any one of the batches to align with the respective array of grippers 25 is needed, the respective conveyor unit, 29a and/or 29b, is activated with aid of sensor data/signals from the sensor units 23s, if needed, to align the batch of object 15 carried by the respective loading tray, 23a and/or 23b.

For each batch of objects 15 carried by a loading tray 23 there is a respective array of grippers 25 in the support assembly Wi. Accordingly, in this specific and non-limiting example the support assembly Wi includes two arrays of grippers 25, each array of grippers 25 extending longitudinally from a respective lateral side of an elongated support 26 of the support assembly Wi, such that the two arrays of grippers are extending substantially perpendicularly to the elongated support 26 and in opposite directions one with respect to other. Optionally, but in some embodiments, the direction in which the grippers 25 extends from the elongated support 26 is substantially parallel to the lane, or to at least some portion of the lane 13.

Figure 2D:
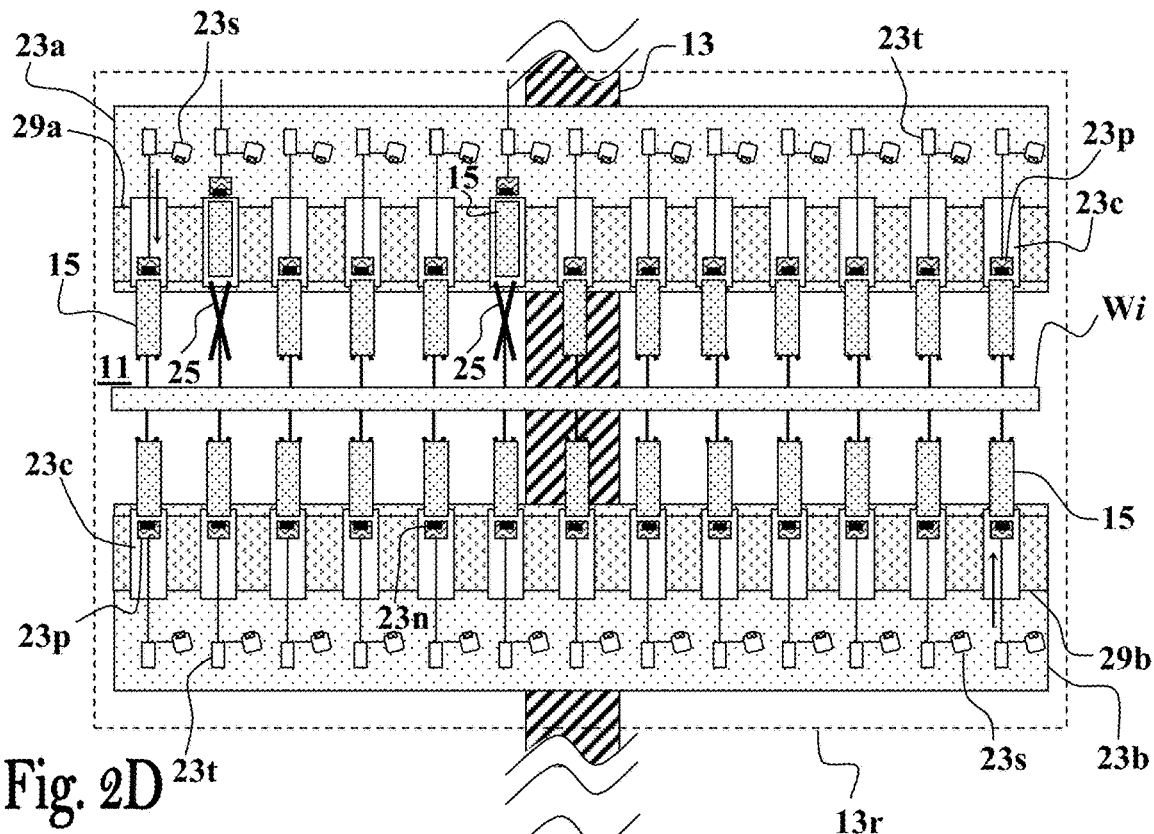

FIG. 2D shows the loading process after actuators 23t of the loading trays 23a and 23b are activated to push the objects 15 thereby carried onto respective grippers 25 of the support assembly Wi. In this state, the actuators 23t are in their extended state, so if all or most of the objects 15 are discharged from the trays, their attractors 23n can be deactivated to release their attachment over the objects 15, and the states of the actuators 23t can be reversed back into their retracted state. FIG. 2D exemplifies a situation in which two objects of loading tray 23a failed to discharge onto their respective grippers 25. Failure to discharge one or more objects 15 from a loading tray 23 can be caused due various different reasons, such as defective/deformed objects, misalignment and/or displacements caused by vibrations and/or wear/exhaustion of the machinery, and suchlike. Such failure to discharge one or more objects 15 from a loading tray is identified by the respective sensor unit 23s and indicated to the control system 12 in the control data/signals Cr it exchanges with the loading system 11.

In some embodiments the sensor unit 23s of each actuator mechanism 23t includes an electromechanical and/or mechano-optical and/or electro-optical sensor element configured to identify the state of the actuator mechanism 23t to determine if the actuator mechanism 23t successfully changed from a retracted state into its extended state, and vice versa. Typically, in the event of object discharge failure, the actuator mechanism 23t will not be able to change into its fully extended state, which will be prevented due to the object 15 being stuck between the ram 23p and the respective gripper 25. Any other type of sensor usable for identifying the actuators' states (e.g., electrical/mechanical load sensor, pressure sensor, etc.) can be similarly used. In some possible embodiments the actuator mechanism 23t includes a flexible link manipulator configured to discharge the objects with minimal impact thereto. Any object discharge failure identified by the sensor unit 23s is indicated to the control system 12 via the data/signals Cr it exchanges with the loading system 11.

The control system 12 can be accordingly configured and operable to determine based on the data/signals Cr received from the loading system 11 which of the grippers 25 of the support platform Wi did not receive an object 15, and update the various different treatment processes 13t, 13p, 13c, . . . , by respective data/signals Ce, Cp, Cc, . . . , in order to deactivate the respective machinery in each treatment process so that treatment can be applied only to/over grippers 25 carrying an object 15 i.e., to prevent application of treatment to/at empty grippers. The control system 12 can be configured to instruct the actuators that failed to transfer of their objects to a gripper to maintain their respective attractors 23n activated, and instruct all or most other attractors to deactivate their attractors 23n, to thereby cause retraction of the objects 15 that failed to transfer to the support assembly Wi back to their cradle arrangements 23c.

Figure 2E:
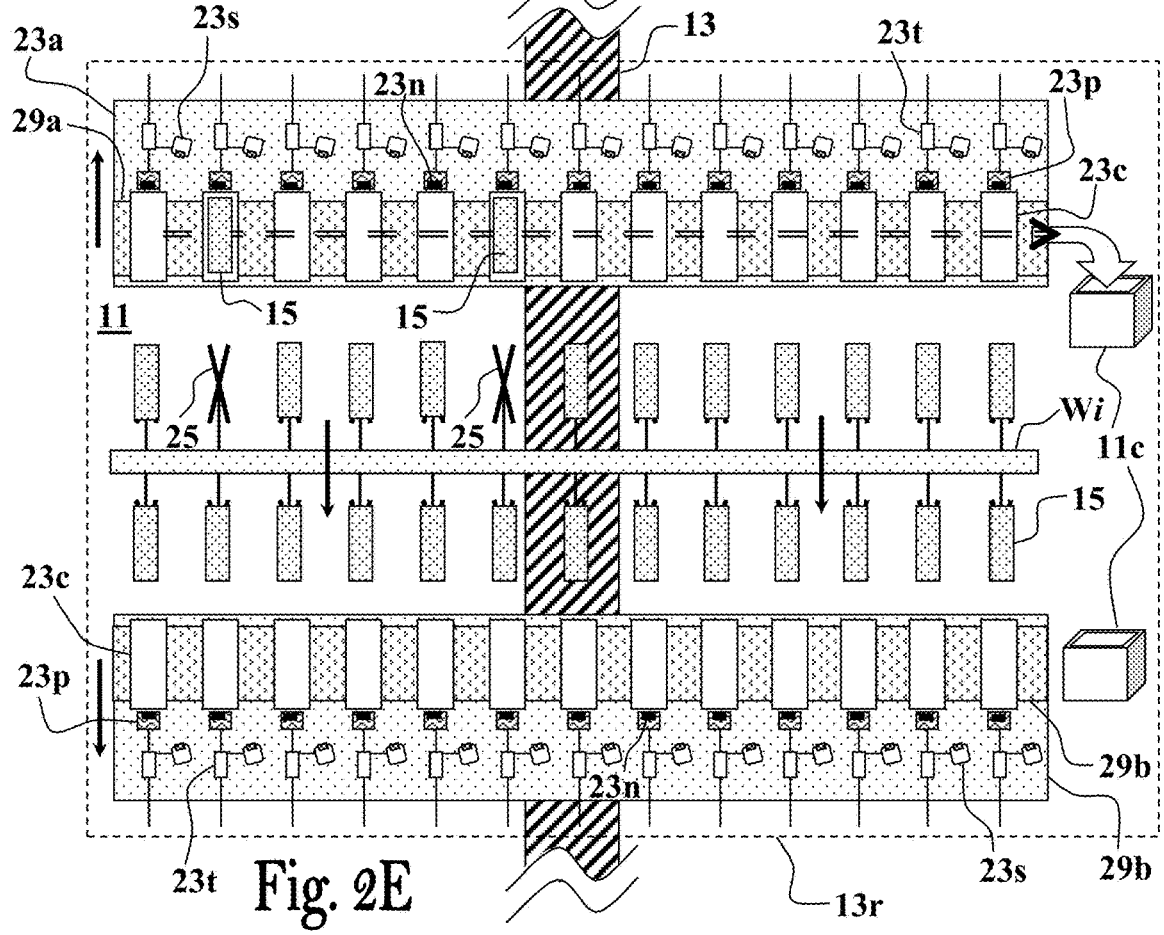

FIG. 2E shows the loading process after the actuators 23t are reversed back to their retracted states. As shown, the two grippers 25 of the support assembly Wi for which the object discharge failed remain empty, and the objects 15 that their transfer to respective grippers failed are retracted by their actuators 23t back to their respective cradle arrangements 23c in the loading tray 23b. Also in FIG. 2E, the loading trays 23a and 23b are disengaged, by moving them longitudinally in opposite directions away from the support assembly Wi, and/or vertically (upwardly or downwardly) to clear the way for the support assembly Wi, and the support assembly Wi is moved over the lane 13 out from the loading zone 13r, and a new support assembly can be moved thereinto for the loading of new batches of objects thereon.

The control system 12 can accordingly generate control data/signals Ci instructing the support assembly Wi to move out of the loading zone 13r, and control data/signals Ci+1 instructing an empty support assembly Wi+1 to move into loading zone 13r for loading new batches of objects 15 thereon. Since two objects 15 remain on the loading tray 23a its conveyor unit 29a is activated to laterally remove the objects 15 therefrom e.g., into container 11c. Based on the data/signals from the sensor units 23s the control system 12 can send control data/signals Cr to the loading system 11 for activating only the conveyor unit 29a of the loading tray 23a to laterally remove the objects 15 remained thereon, without activating of the conveyor unit 29b of the loading tray 23b from which all or most of the objects 15 were transferred.

Figure 2F:
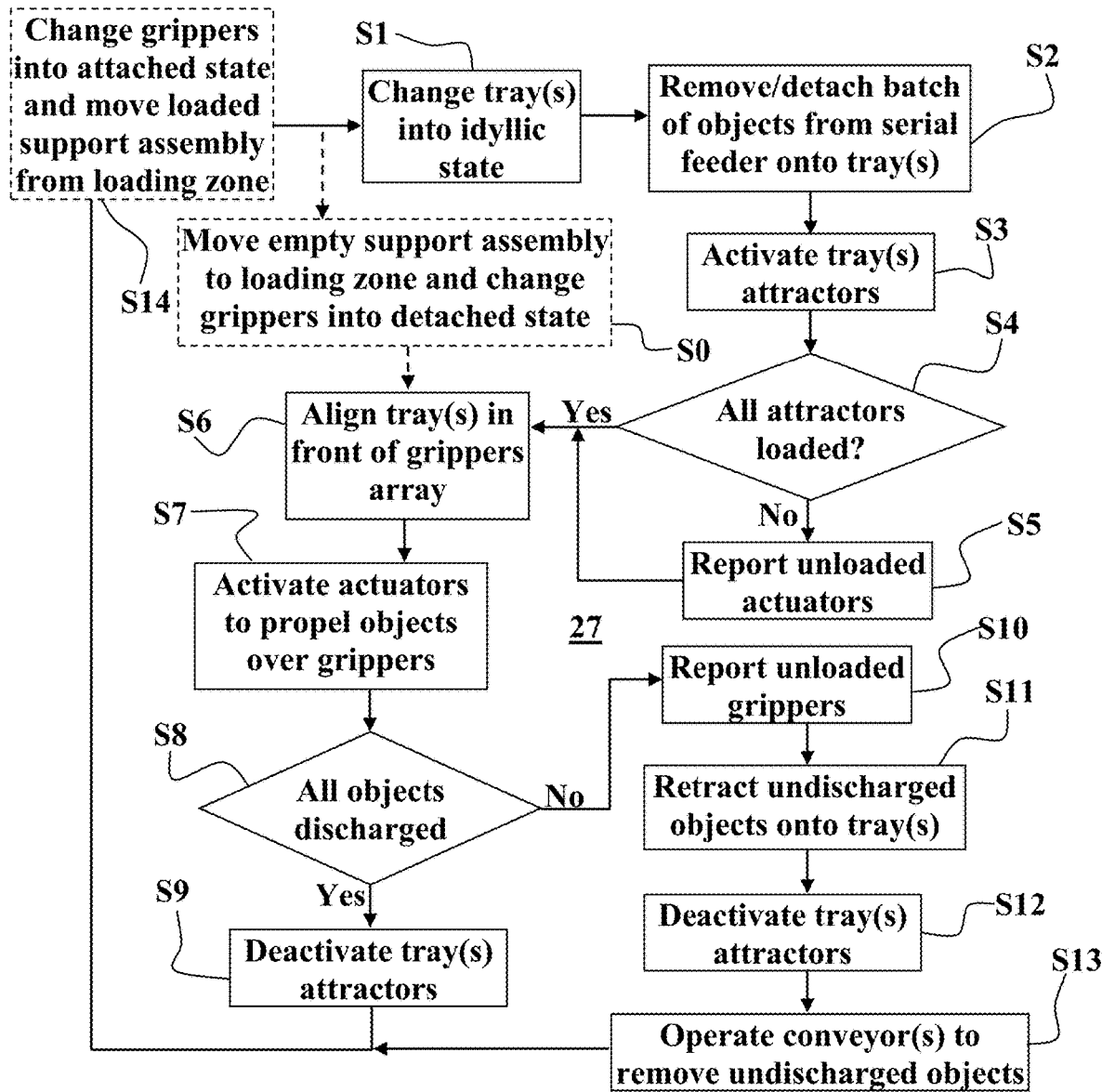

FIG. 2F is a flowchart of an object loading process 27 that can be carried out by the control system 12 according to some possible embodiments. In the initial steps, S1 to S5, one or more batches of objects 15 are detached/removed from respective one or more serial feed conveyors 21 onto respective one or more loading trays 23. Before, or during the initial steps S1 to S5 of the loading process 27, an empty support assembly Wi is positioned in the loading zone 13y and its grippers are changed into their detached state i.e., the attachment elements 25c are retracted to release their contact with the objects, as indicated by step S0.

Specifically, in step S1 one or more loading trays 23 are positioned at one side of respective one or more batches of objects 15 serially introduced by serial feed conveyors 21, and in step S2 respective moving arms 22m are slid towards another side of the one or more batches of objects 15 to transfer them onto the respective loading trays 23. If the moving arms 22m include attractors 22n, they are activated in step S2, simultaneously or selectively, as (or before) they are slid toward the one or more batches of objects 15, and they are deactivated after the one or more batches of objects contact the loading trays 23 to release the objects 15 thereonto. In step S3 the attractors 23n of the moving trays 23 are activated. In step S4 it is checked if all or most attractors 23n are loaded based on the signals/data from the sensor units 23s. If it is determined in step S4 that one or more of the attractors 23n are unloaded, such events are recorded and/or reported by the system in step S5 e.g., to indicate to the treatment processes Ce, Cp, Cc, . . . , that some of objects 15 are missing.

After an empty support assembly Wi is positioned in the loading zone 13r, in step S6 the loading trays 23 are moved towards the support assembly Wi to position each batch of the objects 15 in front of a respective array of grippers 25. If there is a need to align the cradle arrangements of one or more of the loading trays, their respective conveyor units 29a are operated in step S6 to achieve the needed alignment. In step S7 the actuators 23t of the loading trays 23 are activated to push the objects 15 from the loading trays 23 onto respective grippers 25 of the support assembly Wi. Step S8 checks if all or most of the objects 15 were successfully transferred from the loading trays 23 onto the grippers 25, and if so, in step S9 the attractors 23n of the actuators 23t are deactivated to release their attachment of the objects 15 placed on the grippers 25, and the control is returned to step S1 for starting a new object loading cycle.

If it is determined in step S8 that the transfer of one or more of the objects 15 to the grippers 25 of the support assembly Wi failed, in step S10 the system records and/or reports the empty grippers 25 that did not receive objects 15, and/or the respective actuators 23t that failed to discharge the objects 15. The attractors 23n of the actuators that successfully discharged their objects 15 can be deactivated, while maintaining the attractors 23n that failed to discharge active, in order retract them back onto their cradle arrangements 23c in step S11. In step S11 the actuators 23t of all or most of the loading trays 23 are retracted, so in step S12 the attractors 23n of all or most of the actuators 23t can be deactivated. In step S13 the conveyor units 29 of loading trays 23 carrying undischarged objects 15 are operated to remove them laterally from the loading trays 23.

Step S14 is carried out after step S9 or S13, to change the state of the grippers 25 of the loaded supper platform Wi into an attached state i.e., the attachment elements 25c are extracted to contact and hold the objects, and the loaded support platform Wi is then moved out of the loading zone 13r. The control is then passed from step S14 to step S1 for starting a new object loading cycle.

Figure 3A:
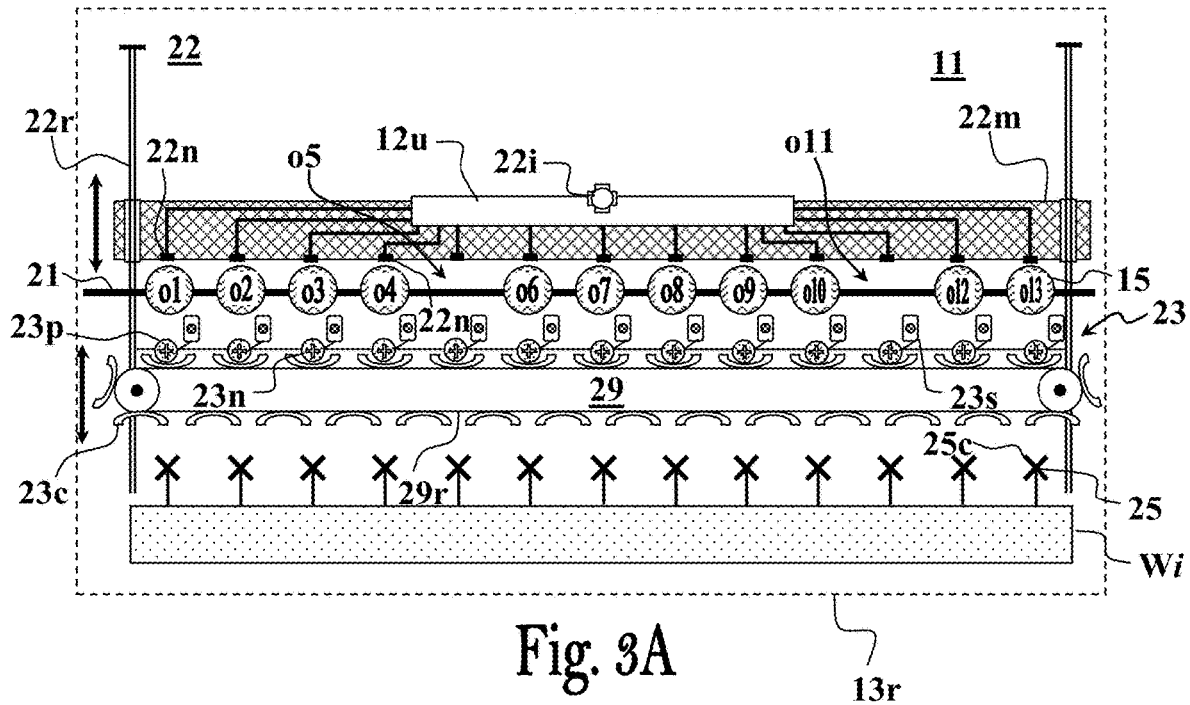

FIG. 3A shows a front view of the loader system 11 according to some possible embodiments. The moving arm 22m of the detachment system 22 is shown in an idyllic state above the objects 15 entering into the loading system. The moving arm 22m includes one or more sensor units (e.g., imagers and/or proximity sensors) 22i configured to detected presence or absence of one or more objects 15 in a batch of objects introduced into the loader system 11 over the serial feed conveyor 21, and its attractors 22n are connected to control unit 22p. The control unit 12u is configured to selectively activate the attractors 22n based on signals/data received from the one or more sensor units 22i to fill empty objects location in the received batch of objects.

Figure 3B:
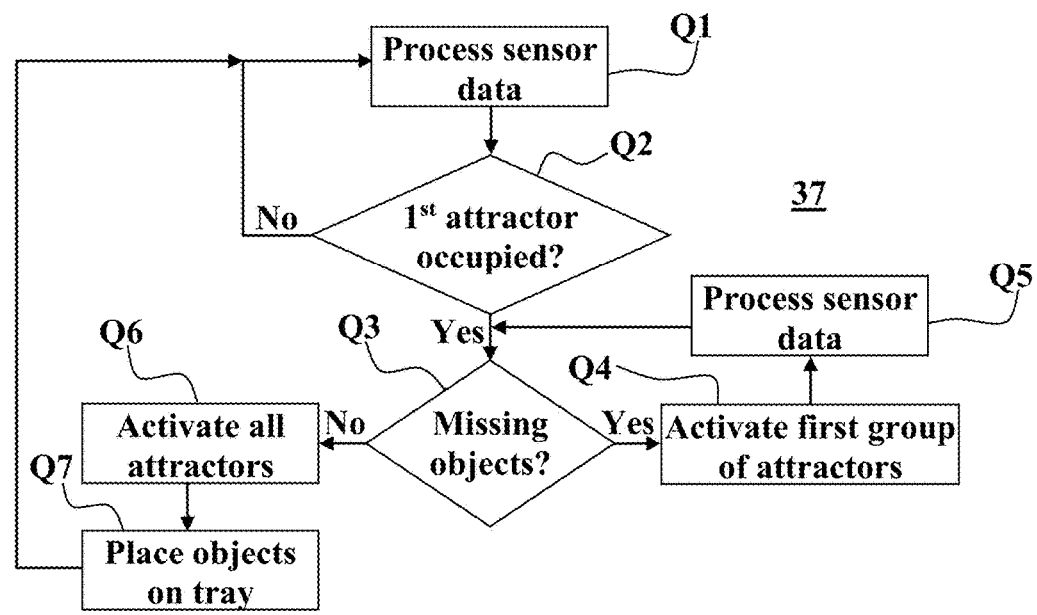

FIG. 3B shows a flowchart exemplifying a process 37 performed by the control unit 12u to guarantee that all or most objects locations in the batch of objects are occupied by objects 15. The process 37 starts in step Q1 in which the control unit 12u processes signals/data from the sensor unit 22i to determine in step Q2 that the first object location in the batch of object entering the loader system 11 is occupied. Steps Q1 and Q2 are performed reputedly/periodically until an object 15 reaches the first attractor (at o1). In step Q3 the control unit 12u process the signals/data from the sensor unit 22i to check if there are empty objects locations in the received batch of objects 15, and if all or most objects location of the received batch are occupied, in step Q6 the control unit 12u simultaneously activates all or most of the attractors 22n of the moving arm 22m in order to attach them thereto and move them in step Q7 to the loading tray 23.

If it is determined in step Q3 that one or more objects location in the batch are missing, then is step Q4 the control unit 12u activates a first group of attractors 22n to immobilize a respective first group of objects 15 received in the loading system 11. For example, in FIG. 3A object locations o5 and o11 of the received batch are empty, so the control unit 12u firstly can activate only the first group of attractors 22n for immobilizing the objects 15 at locations o1 to o4, while the movement of the serial feed conveyor 21 causes all or most other objects 15 to further advance into the loading system 11. Is step Q5 further signals/data are collected from the sensor unit 22i until the identified empty object location becomes occupied. Step Q3 checks if there are still missing objects 15 in the received batch, and if so, in step Q4 the first group of attractors 22n activated by the control unit 12u is increased to include the attractors between the first object location and the objection location before the first empty objection location in the batch. In the example of FIG. 3A, assuming object location o5 became occupied by an object 15, the control unit 12u activates in step Q8 the attractors of object locations o1 to o10 until an object 15 is advanced by the serial feed conveyor 21 to location o11. The loop of process steps Q3-Q5 is repeatedly/periodically performed until it is determined in step Q3 that all or most object locations of the received batch are occupied by objects 15, and the batch of objects 15 is then moved in steps Q6-Q7 to the loading tray 23.

Figure 4A:
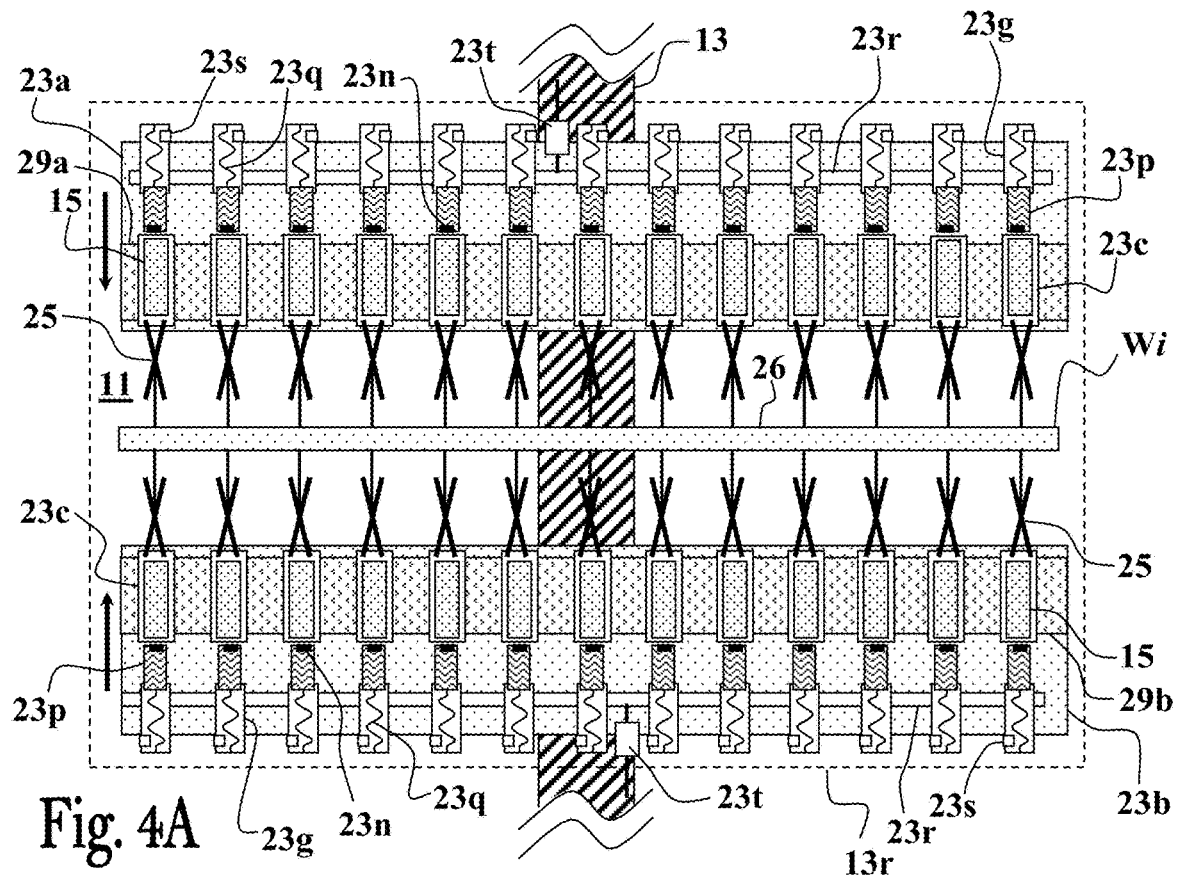
Figure 4B:
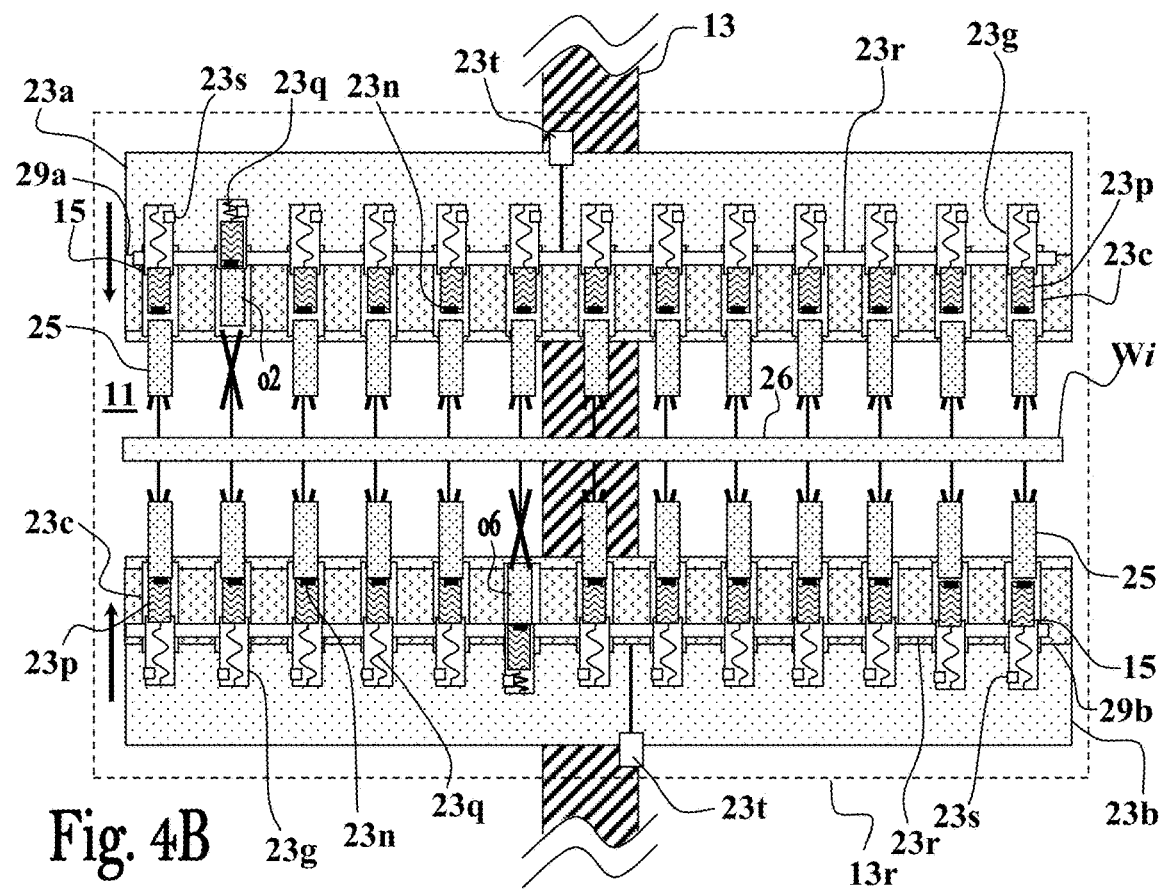

FIGS. 4A and 4B show an embodiment of the loading trays 23 employing flexible object pushing mechanism implement by plunger and barrel mechanisms. In this specific and non-limiting example a single actuator 23t coupled to a pushing arm 23r, to which the plunger and barrel mechanisms are attached, is used to simultaneously push all or most objects 15 from the tray 23 to the grippers 25 of the support assembly Wi. Particularly, in FIGS. 4A and 4B each of the rams 23p is implemented by a moving plunger element having a respective attractor 23n at its free end. Each plunger 23p is movably mounted in a respective barrel element 23g having an elastic element (e.g., compression spring) 23q configured to constantly push the plunger 23p outwardly. The barrel elements 23g further include one or more sensor devices 23s configured to generate sensor data indicative of the state of the plunger 23p.

FIG. 4B shows the moving trays, 23a and 23b, after their actuators 23t are activated to move their respective pushing arms 23r towards the grippers 25 of the support assembly Wi. As exemplified in FIG. 4B, the transfer of the objects in the object location o2 in the batch carried by tray 23a, and in the object location o6 in the batch carried by tray 23b, failed. As shown, the plungers 23p at object locations o2 and o6 in trays 23a and 23b, respectively, are pushed against the force applied by their respective elastic elements 23q into their respective barrel elements 23g. in some embodiments the sensor device 23s in each barrel element 23g includes a pressure sensor configured to detected pressure changes (increments) evolving inside the barrel elements 23g due to the movement of the plunger 23p thereinto.

The control unit (12) is configured to process signals/data received from the sensor devices 23s and identify in each loading tray 23 the object locations wherein the transfer of the object to the support assembly Wi failed. Whenever such object transfer failures are identified, the control unit (12) deactivates the attractors 23n at all or most other objet locations i.e., wherein the objects were transferred to respective grippers 25, and activates the actuators 23t to retract the pushing arms 23r with their plunger and barrel mechanisms back to the loading trays 23. This way, the attractors at object locations wherein object transfer failed (e.g., at object locations o2 and o6 in trays 23a and 23b, respectively) maintain their attachment to their respective objects 15 in order to pull them backwardly onto their respective trays. The loading trays can be then moved to their disengaged positions i.e., away from the support assembly Wi, wherein they can activate their respective conveyor units, 29a and/or 29b, to laterally discharge the objects 15 that did not transfer to the support assembly Wi, as exemplified in FIG. 2E.

Figure 5A:
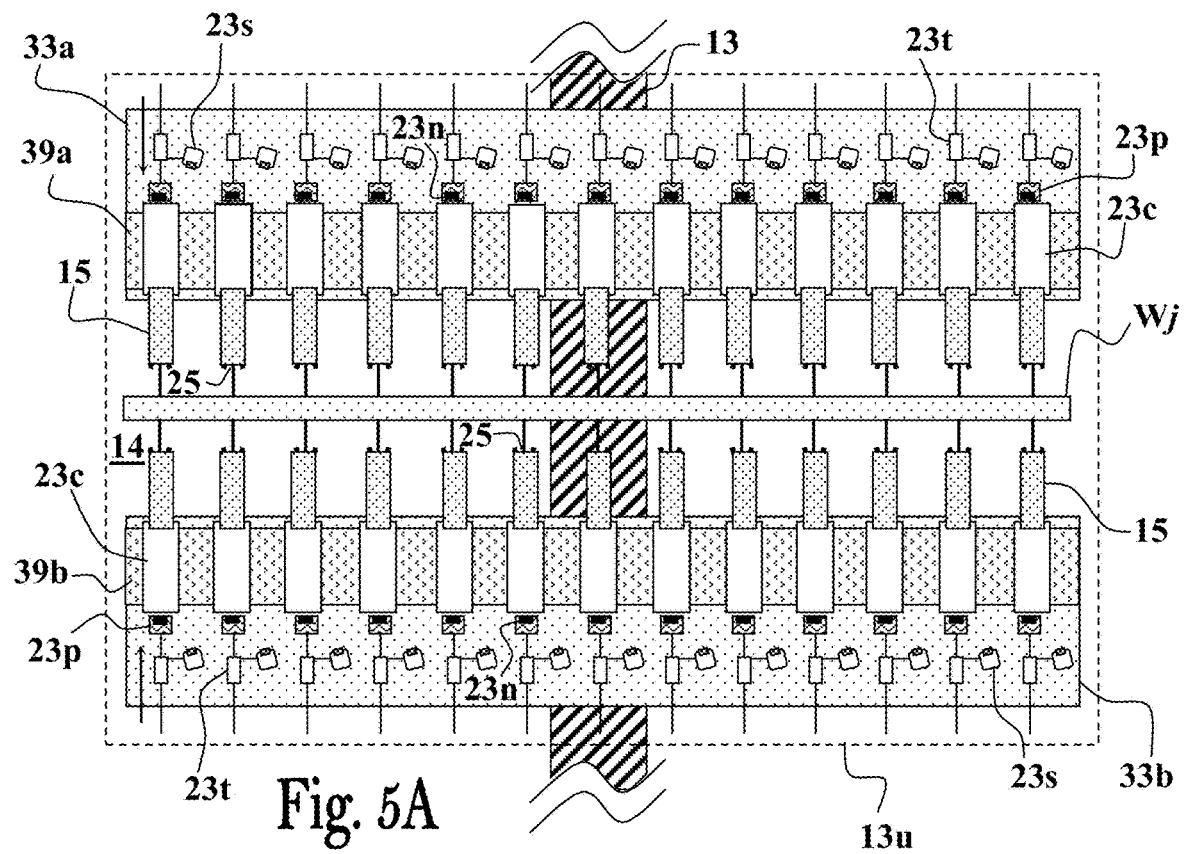

FIG. 5A shows the unloading zone 13u during initial stages of unloading of objects from one or more arrays of grippers 25 of a support assembly Wj onto respective one or more unloading trays 33. The unlading trays 33a and 33b are substantially similar to the loading trays 23a and 23b shown in FIGS. 2A to 2E, or in FIGS. 4A and 4B, and will not be described in details for the sake of brevity. After the support assembly Wj is positioned in the unloading zone 13u the unloading system 14 moves the unloading trays 33a and 33b vertically and/or longitudinally towards an engaged position with the support assembly Wj, in order to position the rams/plungers 23p of each unloading tray 33 in front of a respective gripper 25 of the support assembly Wj. The system can operate the conveyor units 39a and/or 39b of the unloading trays 33 to align the cradle arrangements 23c of each unloading tray 33 with the respective array of grippers 25 of the support assembly Wj.

In this specific and non-limiting example all or most of the grippers 25 have respective objects 15 on them, which is not necessarily the case in practice, since during the loading process the transfer of one or more objects may fail. After the support assembly Wj is positioned in the unloading zone 13u, the attachment elements (25c in FIG. 2B) of the grippers 25 are changed into their retracted states to release the attachment of the grippers over the objects 15.

Figure 5B:
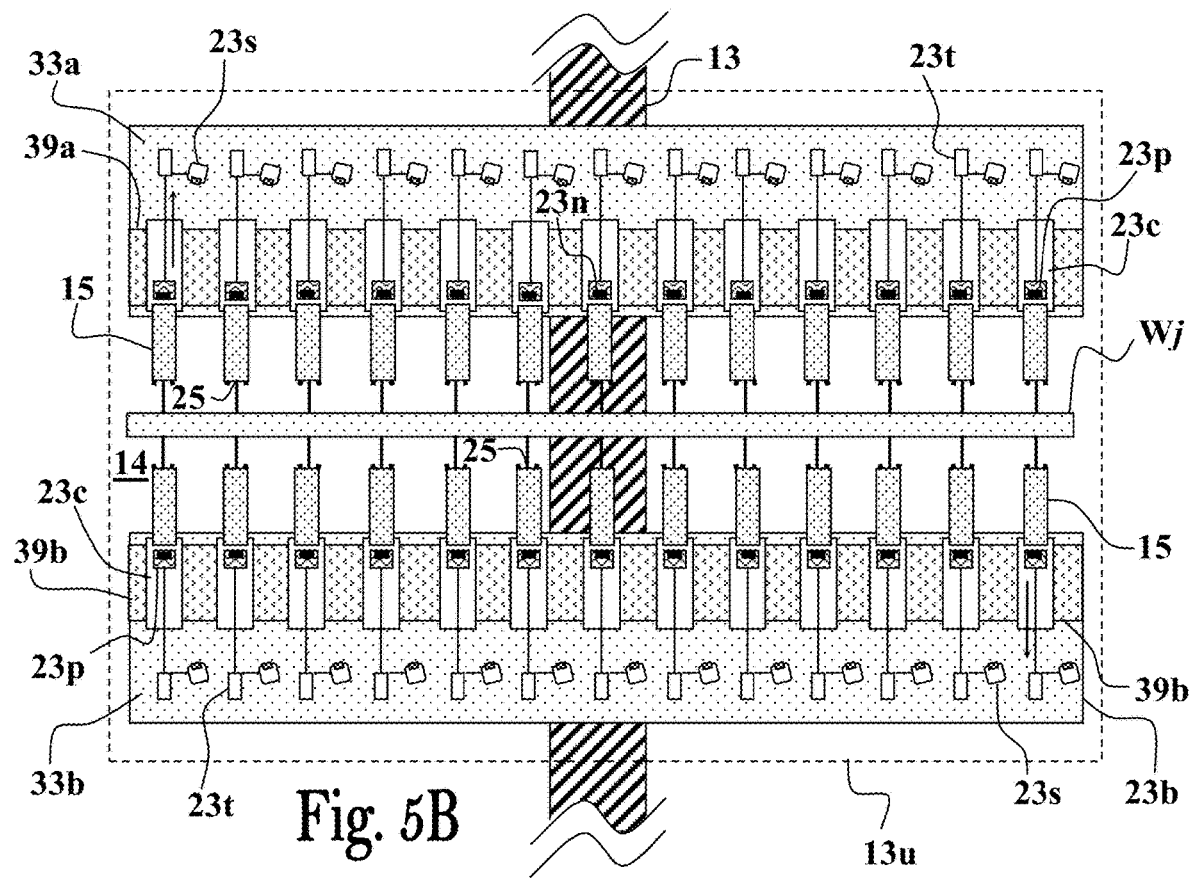

FIG. 5B shows the unloading system 14 after the actuators 23t of the unloading trays 33a and 33b are changed into their extended state to move their rams/plungers 23p to the close vicinity of the objects 15. In this state the attractors 23n of the rams/plungers 23p can be activated to apply attraction forces over the objects 15 located over the grippers/mandrels 15 of the support assembly Wj, and the actuators 23t can be retracted backwardly to their respective unloading trays 33a and 33b. As the actuators 23t are retracted back each of their attractors 23n pulls one respective object 15 from the respective gripper 25 onto a respective cradle arrangement 23c of the unloading tray.

One or more of the rams/plungers 23p can fail to remove their respective objects 15 from one of the grippers 25, which will be detected by the respective sensor units 23s and indicated to the control system 12 by the control data/signals Cu it receives from the unloading system 14. For example, and without being limiting, if the attractors 23n utilize vacuum forces to pull the objects 15 from the mandrels 25, a vacuum/pressure sensor can be used in the sensor units 23s to identify the presence/absence of an object 15 at each attractor 23t. Additionally, or alternatively, an electromechanical and/or mechano-optical and/or electro-optical sensor can be used in the sensor units 23s to detect failure in retracting one or more of the actuators 23t e.g., if for any reason one or more objects 15 cannot be removed from their grippers 25.

Figure 5C:
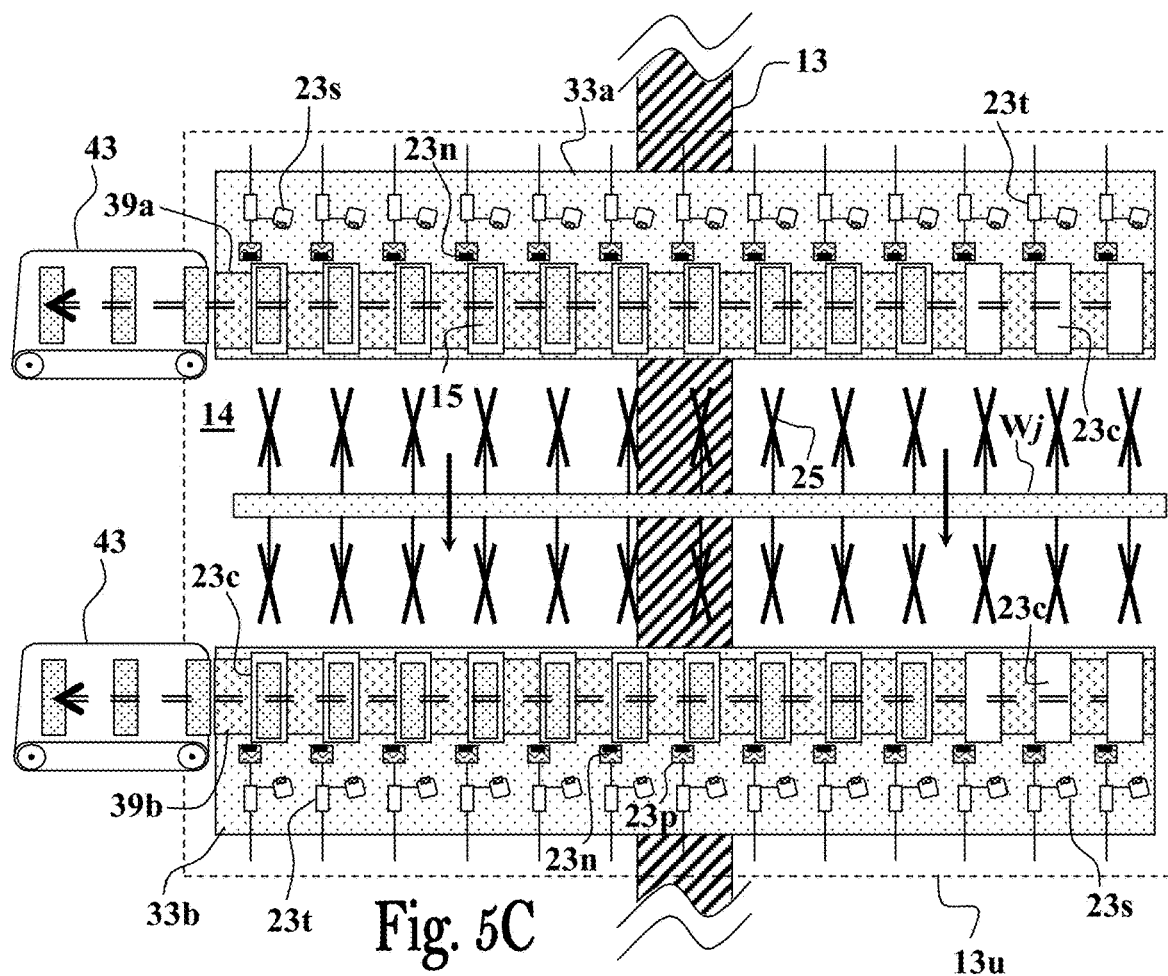

FIG. 5C shows the unloading system 14 after all or most objects 15 are removed from their respective grippers 25 and placed in respective cradle arrangements 23c of the unloading trays 33a and 33b. After placing the objects 15 in their respective cradle arrangements 23c the unloading trays 33a and 33b are moved vertically and/or longitudinally to disengage the support assembly Wj and clear the way for the support assembly Wj. The support assembly Wj is then moved over the lane 13 out from the unloading zone 13u, and a new support assembly can be moved thereinto for the unloading of batches of treated objects. In their disengaged states, the conveyor units 39a and 39b of the unloading trays 33a and 33b are operated to laterally remove the unloaded objects 15.

In this specific and non-limiting example the unloading trays 33a and 33b approach respective dispatch conveyor systems 43 configured to receive the objects 15 laterally removed from the unloading trays 33a and 33b, and transfer them to another production line and/or plant (e.g., for content filling and closure, and/or packaging, etc.). In a similar fashion, the objects 15 can be laterally removed from the unloading trays 33a and 33b and dropped directly into containers (e.g., 11c in FIG. 2E), instead of the dispatch conveyor systems 43.

Figure 5D:
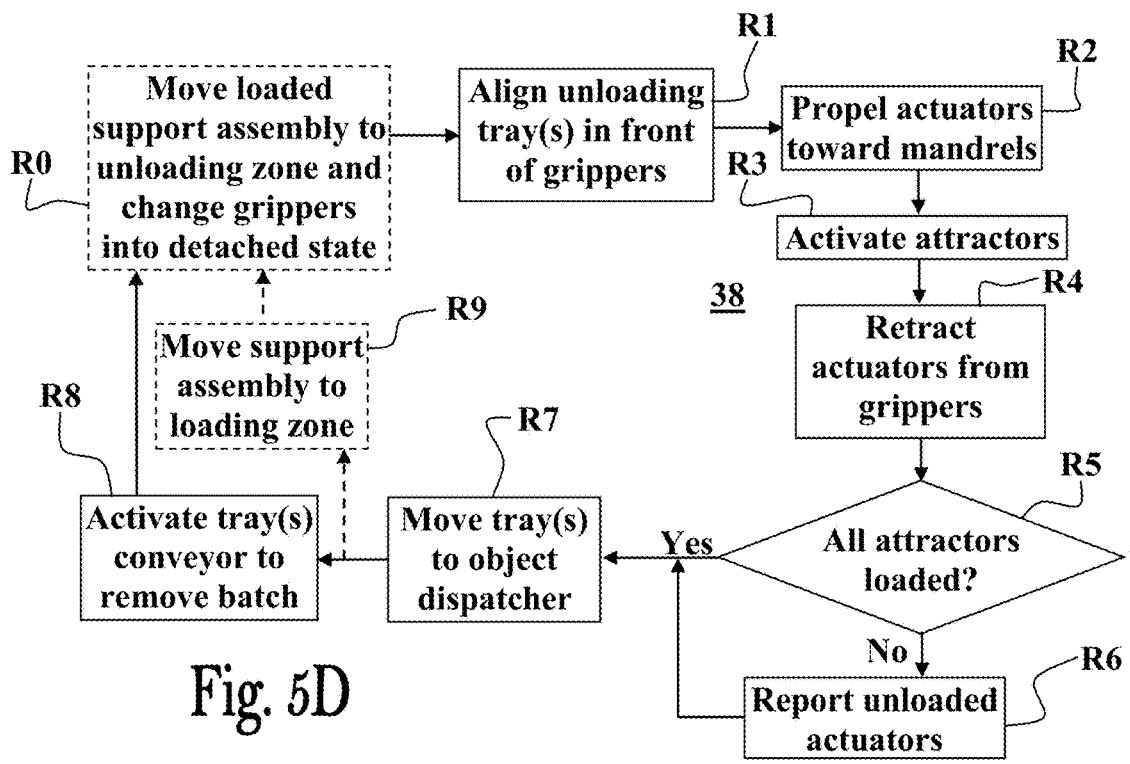

FIG. 5D shows a flowchart of objects unloading process 38 according to some possible embodiments. Before the unloading system 14 can start carrying out its operations, in step R0 a support assembly Wj loaded with one or more objects 15 (e.g., treated objects) is moved over the lane 13 into the unloading zone 13u. After positioning the support assembly Wj in the unloading zone 13u its grippers (25) are changed into their detached state i.e., the attachment elements 25c are retracted to release their contact with the objects. Next, in step R1, one or more unloading trays 33 are placed in their engaged positions in front of one or more respective arrays of grippers 25 of the support assembly Wj. If alignment of the cradle arrangements 23c with the grippers 25 is required in this embodiment, then the respective conveyor units 39 is also operated to align the cradle arrangements 23c with the grippers 25. In Step S2 the state of the actuators 23t is changed into their extended state to bring their rams/plungers 23p to close vicinity of respective objects 15 carried by the grippers 25, and in step R3 the attractors 23n are activated to attract towards each ram/plunger 23p a respective object 15 from a respective gripper 25. In step R4 the actuators 23t are activated to retract their rams/plungers 23p and pull the objects 15 from the grippers 25 of the support assembly Wj onto the respective unloading trays 33.

In step R5 the data/signals generated by the sensor units 23s are checked to determine if all or most of the attractors 23n are loaded with objects 15. If it is determined in step R5 that one or more of the attractors 23n are not loaded i.e., meaning that the attraction of one or more objects 15 by respective actuators 23t failed, in step R6 the system record and/or report which rams/plungers 23p are unloaded with a respective object 15. Failure to remove objects 15 from the grippers can be due to objects being stuck (e.g., due to object deformations and/or debris), and may require intervention of the operator to resolve.

In step R7 the unloading trays 33 are moved vertically and longitudinally, with the objects 15 removed from the grippers, to disengage the support assembly Wj. In this stage the unloaded support assembly Wi can be moved over the lane 13 out of the unloading zone 13u in step R9. In some embodiment the unloading trays 33 are moved in step R7 to respective dispatch conveyors, where their conveyor units 29 are operated to laterally remove the objects 15 thereby carried onto the respective dispatch conveyors. Alternatively, the unloading trays 33 can be configured to transfer the objects 15 thereby carried to respective serial dispatch conveyor systems (e.g., 24 in FIG. 1), or to use their conveyor units 29 to laterally remove the objects 15 directly into respective containers (11c in FIG. 2E), or to respective packaging units.

After the unloaded objects 15 are removed from the unloading trays 33, the control is returned back to step R0, for moving a new support assembly Wi loaded with objects 15 into the unloading zone 13u.

It should be understood that throughout this disclosure, where a process or method is shown or described, the steps of the method may be performed in any order or simultaneously, unless it is clear from the context that one step depends on another being performed first.

Terms such as top, bottom, up, down, front, back, right, and left and similar adjectives in relation to orientation of the loading and/or unloading system and/or the support assemblies Wi, and their components/elements, refer to the manner in which the illustrations are positioned on the paper, not as any limitation to the orientations in which they can be used in actual applications.

As will be appreciated by one of ordinary skill in the art, some embodiments of the presently disclosed subject matter may be embodied as a system, method or computer program product. Accordingly, some embodiments of the presently disclosed subject matter may take the form of entirely hardware embodiments, or embodiments combining software and hardware aspects. Furthermore, some embodiments of the presently disclosed subject matter may take the form of a computer program product embodied in one or more computer readable medium(s) having computer readable program code embodied thereon.

As described hereinabove and shown in the associated figures, some embodiments of the presently disclosed subject matter provides system(s) for interfacing between conveyor systems, and related methods. While particular embodiments of the presently disclosed subject matter have been described, it will be understood, however, that some embodiments of the presently disclosed subject matter are not limited thereto, since modifications may be made by those of ordinary skill in the art, particularly in light of the foregoing teachings. As will be appreciated by one of ordinary skill in the art, some embodiments of the presently disclosed subject matter can be carried out in a great variety of ways, employing more than one technique from those described above, all without exceeding the scope of the claims.

The invention claimed is:

1. A system for interfacing between conveyors, the system comprising:
   a detachment system configured to struck one side of a batch of objects to detach said batch of objects from a serial feed conveyor; and
   a loading tray configured for placement at an opposite side of said batch of objects to receive said batch of objects detached from the serial feed conveyor by said detachment system, and move towards a movable support assembly to discharge the batch of objects thereby carried onto a respective array of grippers of the support assembly.

2. The system of claim 1 wherein the detachment system comprises at least one moving arm configured to strike the batch of objects from the said one side thereof, detach the objects from the serial feed conveyor, and place said batch of objects on the loading tray positioned at another side of the objects.

3. The system of claim 2 wherein the at least one moving arm comprises a respective attractor unit for each object thereby detached from the serial feed conveyor, the detachment system is configured to activate the attractor units when the at least one moving arm is moved towards the objects of the batch to attach them thereto.

4. The system of claim 3 wherein the detachment system comprises at least one sensor device configured to generate signal and/or data indicative of presence or absence of one or more objects in the batch of objects from the serial feed conveyor.

5. The system of claim 4 wherein the detachment system is configured to identify absence of one or more objects in the received batch of objects and responsively selectively activate one or more of the attractor units until all empty objects locations in the received batch of objects are occupied by objects introduced over the serial feed conveyor.

6. The system of claim 1 comprising a plurality of cradle arrangements in the loading tray, the cradle arrangement configured to receive thereon an object from a batch of the objects.

7. The system of claim 1 comprising a conveyor unit in each of the loading trays, the conveyor unit configured to laterally move the objects carried by the loading trays.

8. The system of claim 1 comprising in the loading tray a respective attractor unit for each object of the batch, the attractor unit configured to apply attraction forces over the respective object.

9. The system of claim 8 comprising at least one actuator in the loading tray, the actuator configured to push the objects from the loading tray onto respective grippers of the support assembly.

10. The system of claim 8 comprising a sensor unit associated with each attractor unit, the sensor unit configured to at least detect object presence near the attractor unit and generate data/signals indicative thereof.

11. The system of claim 10 wherein the sensor unit is configured to detect failure to transfer one or more of the objects from the loading tray to the support assembly and generate sensor data/signals indicative thereof.

12. The system of claim 10 comprising in the loading tray a respective plunger and barrel mechanism for each object, the plunger configured to be elastically pushed outwardly from the barrel and its free end comprises the attractor unit for attaching the respective object thereto.

13. The system of claim 10 comprising at least one control unit configured and operable to process the sensor data/signals and determine based thereon absence of one or more objects of the batch of the objects transferred to the loading tray.

14. The system of claim 13 comprising a pressure sensor in each sensor unit, the at least one control unit configured to detect failure to transfer the respective object responsive to pressure changes inside the barrel.

15. The system of claim 10 wherein the movable support assembly is configured to pass the one or more objects thereby carried through one or more treatment process zones, and wherein the at least one control unit is configured and operable to indicate to the at least one process zones the absence of one or more of the objects.

16. The system of claim 10 configured to activate respective one or more attractor units to move the one or more objects that did not transfer from the loading tray to the support assembly back to the loading tray.

17. The system of claim 10 comprising a conveyor unit in each of the loading trays configured to dispose therefrom the one or more objects that did not transfer to the support assembly.

18. The system of claim 1, comprising at least two detachment systems and respective at least two loading trays.

19. The system of claim 1 comprising at least one unloading tray configured to pull a batch of the objects thereonto from a respective array of grippers of a support assembly.

20. The system of claim 19 comprising a plurality of cradle arrangements in the unloading tray, the cradle arrangement configured to receive thereon an object from a batch of the objects.

21. The system of claim 19 comprising a conveyor unit in the unloading tray, the conveyor unit configured to laterally move the objects carried by the unloading tray.

22. The system of claim 19 comprising in the unloading tray a respective attractor unit for each one of the objects, the attractor unit configured to apply attraction forces over the respective object.

23. The system of claim 22 comprising in the unloading tray at least one actuator configured to pull the objects from the grippers of the support assembly by the respective attractor units.

24. The system of claim 22 comprising in the unloading tray a respective plunger and barrel mechanism for each of the objects, the plunger configured to be elastically pushed outwardly from the barrel and comprises the attractor unit at its free end.

25. The system of claim 22 comprising a sensor unit associated with attractor unit, the sensor unit configured to at least detect object presence near the attractor unit and generate data/signals indicative thereof.

26. The system of claim 25 wherein the sensor unit is configured to detect failure to transfer one or more of the objects from the support assembly to the unloading tray and generate sensor data/signals indicative thereof.

27. The system of claim 25 comprising at least one control unit configured and operable to process the sensor data/signals and determine based thereon absence of one or more of the objects transferred to the unloading tray from the support assembly.

28. The system of claim 21 wherein the unloading tray is configured to use its conveyor unit to dispose therefrom the objects transferred thereto from the support assembly.

29. The system of claim 19 comprising at least two unloading trays.

30. A method of interfacing between conveyors, the method comprising:
striking one side of a batch of objects received from a serial feed conveyor system for detaching the batch of objects from the serial feed conveyor system onto a loading tray located at an opposite side of said batch of objects, moving the loading tray towards a movable support assembly; and
discharging the batch of objects carried by the loading tray onto a respective array of grippers of the support assembly.

31. The method of claim 30 wherein the detaching of the at least one batch of objects comprises moving at least one moving arm to strike the objects from one side thereof and place them on a respective loading tray positioned at another side of the objects.

32. The method of claim 31 wherein the detaching of the at least one batch of objects comprises applying attraction forces over each one of the objects to attached the objects to the at least one moving arm.

33. The method of claim 32 comprising detecting by a respective sensor device presence or absence of one or more of the objects of the batch of objects introduced by the serial feed conveyor, and generating signal and/or data indicative thereof.

34. The method of claim 33 wherein the detaching of the at least one batch of objects comprises identifying absence of one or more of the objects in the received batch of objects and responsively selectively activating one or more of the attractor units until all empty objects locations in the received batch of objects are occupied by the objects introduced over the serial feed conveyor.

35. The method of claim 30 wherein the discharging of the at least one batch of objects from the loading tray comprises applying attraction forces over each one of the objects.

36. The method of claim 30 wherein the discharging of the at least one batch of objects from the loading tray comprises pushing the objects from the loading tray onto respective grippers of the support assembly by at least one pushing arm.

37. The method of claim 30 comprising detecting by a respective sensor device presence or absence of a respective object of the batch of objects.

38. The method of claim 37 wherein the pushing of each one of the objects utilizes a respective plunger and barrel mechanism, and wherein the method comprises identifying failure to transfer one or more of the objects from the loading tray based on pressure changes measured in the respective plunger and barrel mechanism.

39. The method of claim 38 comprising indicating to at least one process zone used for treating the objects the absence of one or more of the objects.

40. The method of claim 38 comprising moving the one or more of the objects that failed to transfer from the loading tray to the support assembly back to the loading tray.

41. The method of claim 40 comprising disposing from the loading tray the one or more objects that did not transfer to the support assembly.

42. The method of claim 30 comprising unloading a batch of the objects onto a respective unloading tray from a respective array of grippers of the support assembly.

43. The method of claim 42 wherein the unloading of the objects comprises applying attraction forces on each one of the objects.

44. The method of claim 42 comprising detecting by a respective sensor unit presence of a respective object of the batch.

45. The method of claim 44 comprising using the sensor unit to detect failure to transfer one or more of the objects from the support assembly to the unloading tray.

46. The method of claim 45 comprising discharging from the unloading tray the objects transferred thereto from the support assembly.

47. A detachment system for detaching a batch of objects from a serial feed conveyor, the detachment system comprising at least one moving arm configured to struck the batch of objects from one side of said batch of objects to detach the batch of objects from the serial feed conveyor and place said batch of objects on a loading tray positioned at an opposite side of the batch of objects.

48. The detachment system of claim 47 comprising in the at least one moving arm a respective attractor unit for each object of the batch of objects, the attractor unit configured to apply attraction forces over the object while detaching it from the serial feed conveyor.

49. The detachment system of claim 48 comprising at least one sensor unit configured to detect presence or absence of the objects in the batch of objects and generate signals and/or data indicative thereof, the detachment system is configured to process the data and/or signals generated by the at least one sensor unit to identify absence of one or more objects in the received batch of objects, and selectively activate one or more of the attractor units to immobilize respective one or more of the objects until all object locations in the batch are occupied by respective objects.

50. An object translation system for moving a batch of objects to or from a tray, the object translation system comprising
a plunger and barrel mechanism for each object carried by the tray, a plunger of each plunger and barrel mechanism is configured to be elastically pushed outwardly from a respective barrel element thereof and having an attractor unit at its free end for applying attractions forces over the respective object.

* * * * *